US008626633B1

(12) United States Patent
D'Amico

(10) Patent No.: US 8,626,633 B1
(45) Date of Patent: *Jan. 7, 2014

(54) WEBSITE AND COMPUTER PROGRAM FOR TRANSFER OF RETURN ON INVESTMENT ON A REAL TIME BASIS FOR OIBITDA

(76) Inventor: Martin D'Amico, Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/451,165

(22) Filed: Apr. 19, 2012

Related U.S. Application Data

(62) Division of application No. 12/574,459, filed on Oct. 6, 2009, now Pat. No. 8,219,479.

(60) Provisional application No. 61/195,301, filed on Oct. 6, 2008.

(51) Int. Cl.
*G06Q 40/00* (2012.01)

(52) U.S. Cl.
USPC .......................................... 705/36 R; 705/35

(58) Field of Classification Search
USPC ...................................................... 705/35–37
See application file for complete search history.

(56) References Cited

U.S. PATENT DOCUMENTS

| 6,292,811 | B1  | 9/2001  | Clancey |          |
|-----------|-----|---------|---------|----------|
| 6,564,191 | B1  | 5/2003  | Reddy   |          |
| 6,856,972 | B1  | 2/2005  | Yun     |          |
| 7,165,044 | B1  | 1/2007  | Chaffee |          |
| 7,349,877 | B2* | 3/2008  | Ballow et al. | 705/36 R |
| 7,925,557 | B1* | 4/2011  | Ficery et al. | 705/35   |
| 2002/0123952 | A1 | 9/2002 | Lipper  |          |
| 2003/0158800 | A1 | 8/2003 | Pisello |          |
| 2003/0200164 | A1 | 10/2003 | Jacobs |          |
| 2005/0234794 | A1 | 10/2005 | Melnicoff |        |
| 2006/0212376 | A1 | 9/2006 | Snyder  |          |
| 2007/0250417 | A1* | 10/2007 | Lane et al. | 705/30 |
| 2008/0021750 | A1 | 1/2008 | Masuyama |         |

OTHER PUBLICATIONS

Market-based manpower planning with labour market signals Adams, A. V., Middleton, J., & Ziderman, A. (1992). Market-based manpower planning with labour market signals. International Labour Review, 131(3), 261. Retrieved from http://search.proquest.com/docview/224001742?accountid=14753.*

Financial markets and corporate governance; Financial markets and corporate governance. (1995). Financial Market Trends, (62), 13. Retrieved from http://search.proquest.com/docview/224600122?accountid=14753.*

(Continued)

*Primary Examiner* — Olabode Akintola
*Assistant Examiner* — Abhishek Vyas
(74) *Attorney, Agent, or Firm* — Brian S. Steinberger; Law Offices of Brian S. Steinberger, P.A.

(57) ABSTRACT

Methods and systems for calculating performance of equity investments, such as public stocks, portfolios, mutual funds, hedge funds of publicly traded companies. Performance is calculated with a computer by calculating OiBiTDA (operating income before interest, tax, depreciation and amortization) of each equity investment which takes into account variables that include sales data per week, number of salary people and number of hours of hourly people. The calculated performance data can be disseminated through a subscribed based website and other digital online media, and the like. The return on investment (ROI) for the entire public company as well as for each operating facility of the public company can be determined.

7 Claims, 6 Drawing Sheets

(56) References Cited

OTHER PUBLICATIONS

Transition and crisis in the Japanese financial system: An analytical overview Lapavitsas, C. (1997). Transition and crisis in the japanese financial system: An analytical overview. Capital & Class, (62), 21-47. Retrieved from http://search.proquest.com/docview/209692661?accountid=14753.*

Mergers and acquisitions in the financial services sector Mergers and acquisitions in the financial services sector. (2000). Financial Market Trends, (75), 123-140. Retrieved from http://search.proquest.com/docview/224597602?accountid=14753.*

D'Amico, Martin, The Right Path to Growth, Management Accounting, 1999, pp. 28-32.

Correll, Charles H., The Collaborator Book Review: How to Predict Year-End Case & Energize Any Size Business, National Public Accountant, pp. 30.

D'Amico, Martin, Performance Cash, Earned Hours, 2003, pp. 1-133.

D'Amico, How to Predict Year-End Cash and Energize Any Size Business, Rainbow Books, Inc., 1998, pp. 1-289.

Weatherly, Jonathan, D., Dare to Compare for Better PRoductivity, HRMagazine, 1992, pp. 42, vol. 37, No. 9.

Dobbs, Kevin M., Building an ROI Business Case for Enterprise Compensation Management Solutions. Compensation Benefits Review. 2004. pp. 7-12. vol. 36, No. 4.

Robinson, Robert., A Study of the Relationships Between Employee Stock Ownership Plans and Corporate Perfornmance, PhD Dissertation, University of North Texas, U.S., 1988.

* cited by examiner

FIG. 1

$$\text{Total Employee Hours in a Quarter} = \begin{pmatrix} \text{\# of Salary Employees} \\ \text{X 40 fixed hours per week} \\ \text{X 13 weeks} \end{pmatrix} + \begin{pmatrix} \text{\# Hourly Employees} \\ \text{X \# Hours each works} \\ \text{X 13 weeks} \end{pmatrix}$$

FIG. 2

OiBit Dollars = a + b + c + d a = EPS (Earnings per Common Share) dollars applicable to common shares (take from company Quarterly Revenue Statement)

b = Income Tax Expense (take from company Quarterly Revenue Statement)

c = Interest Expense (take from company Quarterly Revenue Statement)

d = Depreciation (includes amortization)
(Take from Quarterly Cash Flow Statement)

FIG. 3

$$\text{OiBit (As an hourly Benchmark)} = \frac{\text{OiBit Dollar}}{\text{Total Employee Hours in Quarter}}$$

FIG. 4

$$\text{ROI (Return on investment Percentage in cash profits)} = \frac{\text{OiBit Dollars}}{\left(\text{All Outstanding Shares in Company} \times \text{Daily Trading Value of Stock}\right)} \quad 4$$

WEBSITE AND COMPUTER PROGRAM FOR TRANSFER OF RETURN ON INVESTMENT ON A REAL TIME BASIS FOR OIBITDA

CROSS REFERENCE TO RELATED APPLICATIONS

This invention is a Divisional Application of U.S. patent application Ser. No. 12/574,459 filed Oct. 6, 2009, now U.S. Pat. No. 8,219,479, which claims the benefit of priority to U.S. Provisional Patent Application Ser. No. 61/195,301 filed Oct. 6, 2008.

FIELD OF INVENTION

This invention relates to transparency of equity investments for investors, in particular to methods and systems for calculating realtime performance of equity investments, such as but not limited to public stocks, portfolios of those stocks, portfolios, mutual funds, hedge funds, in order for an investor to make acquire or divest these equity investments, by calculating through a computer OiBiTDA (operating income before interest, tax, depreciation and amortization) of each equity investment which takes into account variables that include sales data per week, number of hours of paid salary people and number of hours of hourly people, and for dissemination through media such as but not limited to a website and other digital media.

BACKGROUND AND PRIOR ART

A problem with trading values for an investor is determining which public company stocks is a good investment. Merely looking at daily trading values only tells the investor the value of a share, but not the value of the company itself. The daily trading values gives the investor a false sense of comparing one stock to another.

A mutual fund (a collection of equities) compounds this problem because every corporation has a different quantity of outstanding shares. Currently there is no adequate methodology to combine two or more corporations in a mutual fund to abstract a return on investments because every public corporation has a different quantity of outstanding stock.

The current way to measure the performance of an equity investment is its' trading value on a day to day basis. Example, if the stock is worth $10 today and $12 tomorrow, then it is looked at as a 20% performance of the stock, and gives a false appearance that the company is more valuable. This can occur whether or not the company behind the stock is producing any positive earnings or is losing money. Another example, are internet stocks which have a history of fast increases in value, but have little or no positive earnings or any positive cash flow.

There is no number that ties financial statements into the everyday stock market except earnings per share. These earnings per share are done quarterly of one year to another, which is not real time. The current techniques are limited to looking at past data and not to the most current data which occurs in the last quarter or the last week.

There is no consistent way of tying old data into the financial statements. Earnings per share are the only connections between the stock market and the financial statement. Earnings per share is generally based on taking a number (the last number on an operating statement) and dividing it by the average number of outstanding shares. For example, two companies each earning same dollar earnings, but one company has substantially more or less outstanding shares does not allow for a fair comparison between the companies. The investor would tend to believe that the company with the higher earnings per share in this comparison is the better investment when the opposite may be true.

Earnings per share between companies do not give a good spread indicator between the companies as a percent of sales. For example, companies only being a few percent apart after deductions for income tax deductions does not give an adequate indication of the valuation of that company.

Also, investors will be unsure of the investment potential of stocks in combination with one another. Once again because there is no accountability for the number of shares outstanding, even a Google® having a high percent of sales will have a difficult time retaining such performance criteria in a merger or acquisition combination.

Generally, it is known that traders generally trade equities based on earnings per share, and investment bankers invest in equities based on cash flow, accountants are knowledgeable about cash flow to the dollar, and company management understands little of cash flow and instead relies on the limitations of others such as traders, investment bankers, accountants and the like.

Various types of inventions have been proposed over the years that attempt to analyze financial instruments. See for example, U.S. Pat. Nos. 6,292,811 to Clancey et al.; 6,564,191 to Reddy; 6,856,972 to Yun et al.; 7,165,044 to Chaffee; 7,349,877 to Ballow et al.; and U.S. Published Patent Applications: 2002/0123952 to Lipper, III; 2003/0200164 to Jacobs; 2005/0234794 to Melnicoff et al.; and 2006/0212376 to Snyder et al. However, none of these approaches solves all the problems with the prior art.

Thus, the need exists for solutions to the above problems with the prior art.

SUMMARY OF THE INVENTION

A primary objective of the present invention is to provide methods and systems for calculating performance of company equity investments, such as public stocks, portfolios, mutual funds and hedge that uses realtime analysis of the most recent quarter data for those companies and calculating current values based on the current workforce performance and current cash flows based on the most recent quarter statements.

A secondary objective of the present invention is to provide methods and systems for calculating performance of company equity investments, such as public stocks, portfolios, mutual funds and hedge that does not rely on earnings per share to calculate performance values of those companies' equities.

A third objective of the present invention is to provide methods and systems for calculating performance of company equity investments, such as public stocks, portfolios, mutual funds and hedge that gives the investor a different spread variation to allow the investor to make a better informed decision to purchase or divest of those equities.

A fourth objective of the present invention is to provide methods and systems for calculating performance of company equity investments, such as public stocks, portfolios, mutual funds and hedge that transfers and transforms salary data and hourly wage data of the company equity and ROI (return on investment) from a company stock in order to measure and compare one stock to another, and to compare portfolios to one another.

A fifth objective of the present invention is to provide methods and systems for calculating performance of company equity investments, such as public stocks, portfolios, mutual funds and hedge that does not look at last year statements or statements from a quarter that is more than 13 weeks old, and instead only examines most recent quarter (most recent 13 weeks of operation), or most recent week, on a realtime basis.

The invention covers various methods and systems for calculating performance of equity investments, such as but not limited to public stocks, portfolios of those stocks, portfolios, mutual funds, hedge funds of publicly traded companies, as well as performance of separate operating facilities within each of these companies. Performance is calculated so an investor can make informed decisions on acquiring and/or divesting of these equity investments. The calculations can be done via a database with a computer by calculating OiBiTDA (operating income before interest, tax, depreciation and amortization) of each equity investment which takes into account variables that include sales data per week, number of salary people and number of hours of hourly people. OiBiTDA or OiBit can be expressed as an hourly rate that acts as a denominator for a $1,000 value.

The calculated performance data can be disseminated through media such as but not limited to a subscribed based website and other digital online media, and the like.

The return on investment (ROI) for the entire public company as well as for each operating facility of the public company can also be determined by the invention. The website can be subscriber based where-by investors get real time comparative data for individual stocks as well as those stocks that comprise a portfolio and/or a mutual fund after having Public Corporations submit Hours Paid, a scorekeeper for information under OiBiTDA.

Displays of data showing performance of the public companies and their individual operating facilities can be compared with other publicly traded companies so that interested persons can make informed decisions for acquiring or divesting of equities, as well as allowing for better transparency for government, such as the SEC(Securities & Exchange Commission). Data can be displayed in various grid formats that headings that can include week #(week of the quarter), with Sales (for the week), Units (units sold or transactions or invoices per week), Per Unit (sales divided by units, Hours Paid (employee hours), Cash Profit (OiBit Dollars), Hours Earned (sales and/units), Price Var (price variances verses the prior quarter), Vol Var (volume variances verses the last quarter), and fringes Payroll$$(payroll dollars with or without fringe benefits).

Further objects and advantages of this invention will be apparent from the following detailed description of the presently preferred embodiments which are illustrated schematically in the accompanying drawings.

BRIEF DESCRIPTION OF THE FIGURES

FIG. 1 shows a step of determining total employee hours in a quarter (on a realtime bases, that is taken from data that is reported by the public company).

FIG. 2 shows a step of calculating OiBit dollars from company quarterly revenue statements and company quarterly cash flow statements, that is calculated on a realtime bases based on separate data that can be reported by the public company.

FIG. 3 shows the step of calculating OiBit quarterly dollar benchmark by dividing the OiBit dollars by Total Employee hours in a quarter.

FIG. 4 shows calculating ROI (return on investment) by dividing the OiBit quarterly dollar benchmark, by a denominator that includes all outstanding shares in a company by daily trading value of stock, as divided by 4 to equate to a quarter.

DESCRIPTION OF THE PREFERRED EMBODIMENTS

Figure 5:
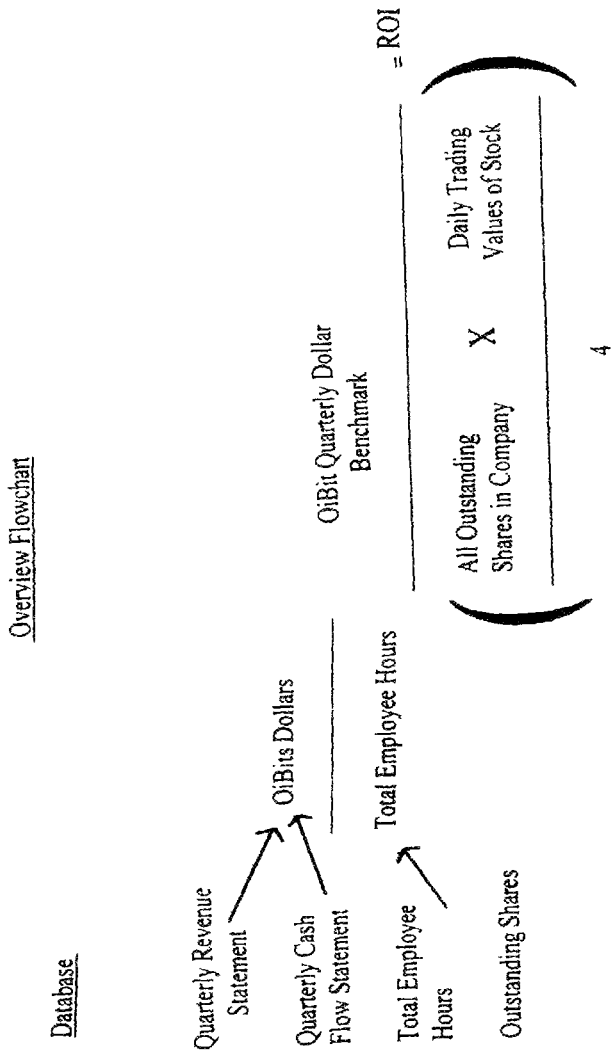
FIG. 5 is an overview flow chart of the separate steps and calculations from FIGS. 1-4.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

The acronym OiBiTDA or OiBit, refers to operating income before interest, tax, depreciation and amortization This invention is about processing data in real time for the benefit of the investor/trader and the performing company with calculations that reach beyond being disputed. The resultant data does not dilute any current information, and only enhances such by adding two elements to whatever information currently imparted every minute of a day the world over for investors as well as traders.

Whether for the corporation or many, the process starts by knowing the OiBit of an hourly rate benchmark with ROI (rate of return) percent of a stock when going to invest (day one) and knowing how it affects a group of stocks thereafter as an hourly rate benchmark with its ROI percent.

The ROI can be for a single investment equity such as a single public stock or for a group of investments such as but not limited to a mutual fund or portfolio.

Whether for one corporation or many, the process starts by knowing the OiBit of a stock (as an hourly rate benchmark) with its ROI percent when going to invest. And knowing how it affects a group of stocks, then after (as an hourly rate benchmark) with its ROI percent.

With an investment of $1,000 an investor will know the exact ownership in Hours from which a person can check a media source to obtain the current Benchmark #3 value as a rate per hour and multiply by the hours owned to derive the plus or minus $1000 OiBit value of the investment. If the Benchmark is negative the investment has a zero OiBit value and a zero ROI.

If any stock is purchased in excess of $1000 or less than, a multiple is derived from the purchase price as divided by $1000. Such an amount with a decimal point times the hours of $1000 equals the ownership.

An investor can take an ROI that changes day to day by going to the invention website to either acquire or divest those equity investments. The choice is not easy but now a person or fund manager has more data intelligence than ever. Benchmark, ROI, if OiBit is positive and the prospects of it going up. More importantly management and shareholders will be singing to the same investor transparency whether or not the former wants to comment or not.

Currently, with the magnitude of public equities (whether a single stock or mutual fund) it is impossible to compare one equity to one another or to compare one equity to anyone of more than ten thousand others. Thus, the investor/trader cannot make an informed decision in realtime to acquire or divest of equity investments. The invention solves this common problem of not being able to make informed decisions.

The invention allows for transparency for investment purposes, and also allows for accountability of the public company. For example, an ROI that is substantially dropping over days or months can send a red light signal to shareholders and/or the SEC(Securities & Exchange Commission) and/or directors and/or management that a problem of dilution of equity value exists that must be addressed, or the shareholders may bail out (sell out their shares).

The changing ROI and OiBit benchmarks will give an equal transparency to investors, traders, management, employees, SEC(Securities & Exchange Commission), state and federal government agencies, and any other interested party that has concerns and interests in a companies equities.

The invention would have prevented the financial disasters created by companies such as Enron® or rogue managers such as Madoff from continuing to run their fraudulent operations to the detriment of those interested persons. For Enron® or Madoff, and if investor transparency were true then investors would have bailed out sooner. If transparency were false like it was in those cases, there would have been many signs prior to the eruption.

ROI allows for instant and realtime checking of the cash being received by the company (deposited in the bank) by any of these companies.

A first step is to determine total employee hours of a company in a quarter.

FIG. 1 shows a step of determining total employee hours in a quarter (on a realtime bases, that is taken from data that is reported by the public company).

Here, the invention will determine fulltime (and preferably including part-time) employee hours paid in the quarter by combining all salary hours and all hourly employee hours. Currently Yahoo® lists reports for public companies list all full time employees as solicited which includes salary persons and hourly persons. The data can be compiled and regularly updated by a computer.

An example of determining total employee hours in a quarter will now be described. A company having salary personal of 100 people is multiplied by a fixed 40 hours per week and multiplied by 13 (weeks in the quarter) is added to hourly people and the hours they actually get paid for in that quarter (assume 100 hourly people) by hours they worked (assume 50 hours each week) by 13 weeks, then 52,000 (quarter on salary people) plus 65,000 (quarter on hourly people)=117,000.

A second part of the invention is to determine the OiBit Dollars.

FIG. 2 shows a step of calculating OiBit dollars from company quarterly revenue statements and company quarterly cash flow statements, that is calculated on a realtime bases based on separate data that can be reported by the public company.

The OiBit dollars can be calculated in realtime by a computer by taking data from both the company Quarterly Revenue Statement and the Quarterly Cash Flow Statement. Both the company Quarterly Revenue Statement and the Quarterly Cash Flow Statement are submitted quarterly to the SEC (Securities and Exchange Commission).

$$OiBit\ dollars = to\ a+b+c+d$$

Wherein in the following example, a, b, c, and d are defined with example amounts:

a) EPS (earnings per common share) Dollars applicable to Common Shares, comes from company quarterly revenue statement;
Dollars applicable to ownership in shares of the corporation. For example, company x has $200,000 in EPS, and 12,000 shares outstanding;

b) Income Tax Expense comes from company quarterly revenue statement. For example, company x has $50,000, PLUS (can also be listed as a credit or stipend);

c) Interest Expense comes from company quarterly revenue statement, for example, $15,000, PLUS (can also be listed as a credit or stipend);

d) Depreciation (that also includes Amortization) comes from Quarterly Cash Flow Statement, For example, $12,000;

In this example, OiBit equals a+b+c+d=$277,000

The next step is to calculate a numerical benchmark for OiBit as an hourly benchmark.

FIG. 3 shows the step of calculating OiBit quarterly dollar benchmark by dividing the OiBit dollars by Total Employee hours in a quarter. With this example, we calculate a numerical benchmark by OiBit divided by employee hours 277,000/117,000=$2.37 (rounded). That is benchmark transparency for the quarter for the company. Company A=$2.37

If another company (Company B) has numerical benchmark of $15.00, we can compare the two companies by a common denominator ($1,000)

Company A $1,000/$2.37=421.9 hours

Thus, if an investor invests $1,000 on this day in the stock, he would own 421.9 hours (the 421.9 hours remains fixed until the investor buys more shares or sells both shares of the stock).

Next quarter, the company numerical benchmark will go up or go down. Assume it goes up to $2.50, then multiply the new benchmark by the old hours owned (421.9)=$1054.75. This is the new OiBit dollar value of the investment If you divide by original investment (here $1,000), then, it is a 5.5% growth from quarter to quarter.

The same percentage can be calculated by dividing the 2.5 by the 2.37=1.054 (change of 5.5%)

The invention would list the numerical benchmark so the individual investors can determine if the investment is going up or down.

This shows the change in performance of the corporation behind the stock from quarter to quarter.

Also the invention allows for calculating the ROI (return on investment percentage in cash profits) on a realtime basis, which also shows the change in performance of the company behind the stock from quarter to quarter.

FIG. 4 shows calculating ROI (return on investment) by dividing the OiBit quarterly dollar benchmark, by a denominator that includes all outstanding shares in a company by daily trading value of stock, as divided by 4 to equate to a quarter.

$$ROI = \frac{OiBit\ \text{Quarterly Dollar}}{((\text{all outstanding shares} \times \text{daily trading value of stock})/4)}$$

where $ROI$ is return on investment percentage in cash profits =

$$\frac{OiBit(\text{Quarterly dollar benchmark})}{((\text{all outstanding shares} \times \text{daily trading value of stock})/4)}$$

With the example, above, OiBit quarterly dollars ($277,000) divided by all outstanding shares (0.62129 Billion) multiplied by trading value ($53.42 per share) (equals 33.189 billions) divided by 4, equals 0.8297 billions.

$$ROI = \frac{\$277,000}{8,297,000,000} = .0033\% (ROI)$$

With the invention, ROI changes everyday because trading value changes every day. The higher the ROI, the better the company. The corporation has the ability to put more money back into the business and/or to pay dividends.

Google® has a low ROI because traders have over valued their stock, and banks have high ROI because they need cash to loan to people. However, banks may have bad loans on their books which can also devalue their stocks trading value.

If the stock was trading at $50 per share, he would be able to buy 20 shares having a trading value of 100. If the next day, the stock goes up to $52 per share, the trading value would be 52×20=110 so that the trading value of the stock is now $110.

The invention allows the trader/investor, managers, employees, SEC and other interested persons an equal transparency to compare the valuation of those equities. The invention can compare each benchmark by a common denominator, preferably $1,000 at all times.

FIG. 5 is an overview flow chart of the separate steps and calculations from FIGS. 1-4. As previously noted, a database can retrieve information on quarterly revenue statements, quarterly cash flow statements, and total employee hours and outstanding shares of companies that are using the invention. OiBit Dollars can be calculated and then a OiBit Quarterly Dollar Benchmark can be calculated followed by calculating an ROI for each of those companies.

Figure 6:
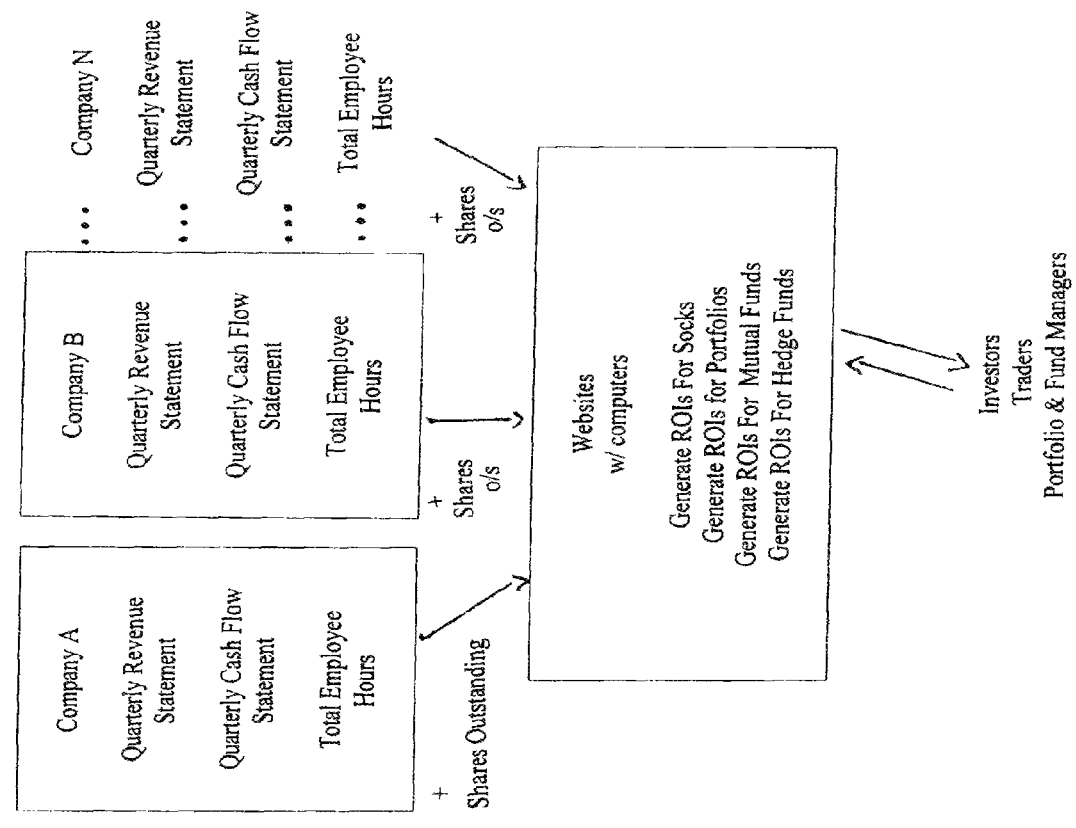
FIG. 6 shows an application of a website retrieving data from and calculating OiBit dollar numerical benchmarks and ROI (return on investments).

FIG. 6 shows an application of a website retrieving data from and calculating OiBit dollar numerical benchmarks and ROI (return on investments). Different companies identified as company A, company B up to Company N will have data from their quarterly revenue statements, quarterly cash flow statements, total employee hours and total shares outstanding. This data can be fed in quarterly reports and realtime submission to a central database at a website. Here, calculations of OiBit Dollars, OiBit Quarterly Dollar Numerical Benchmarks, and ROIs can be generated for individual stocks, portfolios, mutual funds and hedge funds. Investors, traders, portfolio and fund managers can retrieve the reports on their personal computers, portable phones, portable computers, and the like. In addition, government agencies such as the SEC can monitor these reports as well. The interested investors can then make informed decisions on acquiring or divesting equity investments in those companies.

Investor Transparency Benchmark (Benchmark #3 or Bx #3)

An application of using the invention with a investor transparency as a common denominator for an investment of $1,000 at all times, using a benchmark (herein referred to as Benchmark #3 or Bx #3) will now be described.

A $1000 Investment is the means to convey a consistent value once an Investor has paid that amount or a multiple of $1000 for a Public Stock, or a Basket of Stocks as in a Portfolio & Fund.

It is the intension of this Inventor that when Investor Transparency in the Form of Benchmark #3, an Hourly Rate is quoted privately or publicly for a Stock or for a Basket or Stocks there is an implied assumption that the amount is a denominator to $1000, a numerator A continuous Data Base composed of Stocks with Trading Values calculates the Investor Transparency (Bx #3) of Public Corporations. The Data with its Yahoo Page Source Follows Profile head count full time employees (95761) Key Statistics Outstanding Shares (0.62129 million) Annual Dividends per Share ($1.68) Quarterly Revenue Statement a) EPS Dollars applicable to Common Shares ($381 million) b) Income Tax Expense ($40 mil.) (c) Interest Expense ($381 mil). Quarterly Cash Flow Statement d) Depreciation ($538 mil. that also includes Amortization). Investor Transparency or Bx 3 Dollars are=a $371 million+b $40 mil+c $381 mil+d $538 mil=$1.330 Billion.

Bx #3 as a Rate per Hour=$1.330 billion×1 million/(divided by the Head Count (95761)×500/1000 hours for a Quarter)=47,881 million=$27.78 per Paid Hour. There is an 8$^{th}$ amount from Yahoo per the Opening Page of Each Corporation, Estimated Annual EPS. The amount times OS Shares times the latest Quarter's Ratio of OiBiTDA Dollars to EPS Dollars=Annual OiBiTDA Dollars. The inventor christened this ratio as the Tell Tale Ratio. It has many other management, auditing and income tax uses.

Return on Investment, ROI for a Quarter

When the Trading Value of a Stock ($53.42 September 18) times a Corporation Outstanding Shares (0.62129 million) is divided by 4, it=$8.297 billion (¼ of the Corporation Dollar Value). Such Dollar Value as a denominator for OiBiTDA Dollars above=16.0% a percent called ROI. As Trading Value of Stocks change each day so do all ROIs of Stocks and Funds. The process records new Stock & Fund ROIs: up ROIs (TRADE VALUE Down) or down ROIs (TRADE VALUE up). The important part of the Entire Investor Transparency Process for Bx #3, the same and ever changing daily ROI of all OS Shares of Each Equity transfer the change for the Exact Quantity as held by a Portfolio or Fund with no effect on Benchmark #3, OiBiTDA Dollars per Hour.

The above daily arithmetic Mechanics for Stocks as of the close Sep. 18, 2009 in Comparison to other Stocks is in Table 1

TABLE 1

| OiBiT for Q | Hours | Bx #3 | ROI | Stock |
|---|---|---|---|---|
| $1.231 | 33,000 | $37.30 | 11.9% | AXP |
| $2.050 | 81,100 | $25.28 | 22.2% | BA |
| $4.282 | 141,500 | $30.26 | 13.4% | BAC |
| $1.330 | 47,881 | $27.78 | 16.0% | CAT |
| $2.218 | 33,065 | $67.08 | 6.6% | csco |

Column 1 of the Chart (Table 1) above are the latest OiBiTDA Dollars for Q 2 09, while Benchmark #3 as a denominator is $27.78 that equals—$1000/27.78 or 36.0 Hours Owned with an ROI of 16.0%. The same $1000 at the closing price for Caterpillar on Sep. 18, 2009 was $53.42 that purchased 18 whole shares (18×$53.42)=$961.56. A $2500 investment on September 18 would have a 2.5 multiple to 36 Hours.

If CAT's trading Value closed down on the following day driving the ROI up, ownership for the Investor remains at $1000. Soon thereafter CAT's Bx #3 will change. However changed—i.e. up to $31.07 the Investor would have $1118.52 (31.07×36.0) of Investment Value—i.e. down to $26.50 would=$26.50×36.00=$954.00 of Investment Value.

The EPS Estimate per Yahoo cited above as the 8$^{th}$ amount times Outstanding Shares times the latest and respective Tell Tale Ratio of each Stock equals the Annual OIBiTDA Dollars with a Bx #3 of $31.33. Such Value×36.00 Hours Owned=$1127.88 an increase of 12.8% below as calculated by the Rate Change or by the dollars of change $127.88/$1000). See Table 2.

TABLE 2

| Dow Deviation as a percent vs Beginning of Q | | | | | | |
|---|---|---|---|---|---|---|
| DJIA Bx # 3Q | 9820 Bx 3 Year Out | 9/18 close Estimated | 3/30 OiBiTDA Growth | Q3 09 & New ROI | 9496 103.4% trade change | Bx #3 Q Hrs per 1000 |
| $37.30 | $43.47 | AXP | 16.5% | 11.9% | 100.0% | 26.8 |
| $25.28 | $13.73 | BA | −45.7% | 22.2% | 100.0% | 39.6 |
| $30.26 | $19.21 | BAC | −36.5% | 13.4% | 35.5% | 33.0 |
| $27.78 | $31.33 | CAT | 12.8% | 16.0% | 100.0% | 36.0 |
| $67.08 | $75.37 | csco | 12.4% | 6.6% | 100.0% | 14.9 |

Column 6 is the latest relationship to Current Trading Value as dated by the closing DJIA. (September 18). All are at 100% except BAC that had an actual change to BX #3 from day 1 on Sep. 1, 2009.

To summarize all the Arithmetic as Briefly as Possible, Bx #3 exactly Measures Change Not change in Trading Value, but the Change of Intrinsic Value—the Cash Profit or OiBiTDA that an investment produces. Whether for a One Corporation or many, the process starts by knowing OiBiTDA of one Stock when going to Invest (day one) and how it affects a group of stocks on day one and thereafter (below). The fact that Fund Managers have never been able to use this invention before will insure some Investing success when Managers eliminate Equities that have never demon- Because the Fund did some divesting for some of the stocks of March 31 had significant gains $9.2 million that I allocated percentage wise per their report based on trading value. Such gains along with income net of expense $308,056 (also allocated) produced a DNA for the Fund's Operations of $44.15 per Hour per Hour at a 19.3% ROI of Trading Value.

This Investor Transparency as labeled DNA would best be part of reporting by the Fund itself via its website each week with a Management Explanation of the detail in comparison to those numbers on the right.

TABLE 4

| Div Yield 1.7% | The Fund Itself EPS/EPH Shares 4,707,419 | ROI Hours 616349 | 9/18 dose Bx #3 $28.66 | Dow 30 $34.95 | Trade Value | OiBiT $$ | Bx #3 & ROI $39.57 |
|---|---|---|---|---|---|---|---|
| | OiBiT/ROI $141,291,120 | $17,662,058 | 12.5% | 14.4% | 129,312,740 | $24,138,761 | 18.7% |
| | Fund Operations Operating Expenses | | | | | | |
| | Other Income (net) | $308,056 | | | | $313,042 | |
| | Gains(Losses)trading | 9,241,675 | | per $1000 | | (12,753,573) | per $1000 |
| | DNA of Fund/Portfolio | $27,211,789 | $44.15 19.3% | 22.7 | | $11,698,230 $18.09 | 55.3 9.0% | strated that such investments can sustain Cash Profit over reasonable lengths of time.—Because Time is always Money—

A Simulated Format of a Mutual Fund and/or Hedge Fund

The September 18 Trading Value of the below chart (Table 3) is an abstract of my Mutual Fund with 18 Dow Stocks and the exact Quantities owned as of Jun. 30, 2009. (The Symbol USA Closed End on the NYSE). It is a comparison to $129.3 Million of Value when I did the same abstract for 19 Dow Holdings for Mar. 31, 2009 and as of Sep. 1, 2009 as well.

On September 1 Bx #3(Benchmark #3) of $39.57 produced a quotient of 25.3 from the $1000 numerator that is now 34.9 at only $28.66 as of Sep. 18, 2009, a 38.1% drop in both the Benchmark and the dollar worth of only $724.22 as would be published for a fund, with an ROI of 12.5 for total trading Value of $141.3 million).

TABLE 3

| DJIA | 9,820 | 9/18 dose | Hours | $1,000 |
|---|---|---|---|---|
| Shares | Trading Value | OibIT $$ | 616,349 | Invested |
| 4,707,419 | $141,291,120 | $17,662,058 | ROI | Hours |
| Investor Transparency | | Bx #3 | 12.5% | Owned |
| $30.01 | Per Share | $28.66 | ownership | 34.9 |
| All Outstanding Shares | Hedge-Index % | | 14.4% | |
| first day | Sep. 1, 2009 | | | |
| Shares | Trading Value | OibiT $$ | | |
| 4,443,029 | $129,312,740 | $24,138,761 | 610,057 | |
| Investor Transparency | | Bx #3 | ROI | |
| $29.10 | Per Share | $39.57 | | 25.3 |
| 3.1% | Q 2change | −38.1% | | |
| Trade Value | 9.3% | | | |
| With the Proof as a Common denominator to $1000 Invested | | | | |
| Today | 25.3 | $28.66 | $724.22 | |
| Sep. 1, 2009 | 25.3 | $39.57 | $1,000.00 | −38.1% |

Now for the Fund Itself Below

Please note the 9/1/pass down of Bx #3 at $28.66 with an ROI of 12.5% for all owned shares to the Fund Itself as compared to that of the DJIA OS Shares at a 14.4% ROI. Truly a hedge result for all Equity Hedge Funds that will be updated weekly on the left in comparison to the right for the prior Quarter below.

The Application is for Creating Data not Processing Data

The invention is about creating data, not processing data as done by most real time companies.—creating data for the benefit of both the Investor and the Performer jointly, with basic arithmetic that reaches beyond being disputed—the arithmetic data does not dilute any current information, only enhances such by adding two elements to whatever information currently imparted every minute of a day the World over for Investors as well as Traders.

Because the Hour Technology is universal and authentic by design its massive Wall Street Market has an equally impressive Industrial Market. The process is 100% computer accurate as currently handled for a limited number of Public Stocks already listed on major exchanges. The process is again 100% accurate when the same Public Stock data is collected for a basket of stocks for Managers and their Investors, whether for a Portfolio, a Mutual Fund, a Hedge Fund and Private Equity.

The creation of this specifically formatted data of all Public Equities in behalf of all interested parties will satisfy a desperate need for Investor Transparency with a true common denominator literally and positively.

Common Transparency for all Interested Parties

OiBiTDA & Its ROI Value in the Context of $1000 At All Times & How Much it Changes Weekly Technology A of (A & B)

The Variable Life of a Stock as well as a Stock in a Portfolio, Mutual Fund and Hedge Fund.

The following is a demonstration in slow motion from instantaneous calculations of Daily Documented Public Data for:

Inventor Transparency Technology A

A Stock-Caterpillar for the Quarter Ended Dec. 31, 2008 on ($1^{st}$ chart below (Table 5)) A Portfolio for 101,500 Shares composed of 5 different Stocks including Caterpillar, April 23 & May 15 Investor Transparency for the Investor=Ultimate Transparency For all Other Interested Parties Measuring the Change to the DJIA for all Concerned is a short cut to documentation and understanding the arithmetic of this Patent Application. This graphic in slow motion is presented last under the caption May 22, 2009.

Technology A transfers the Quarterly ROI percent as expressed for the OiBiTDA Dollars as divided by each day's Closing Trading Value Dollars for ¼ of all outstanding shares of each Public Corporate Component to the specific quantity of shares as held by a Portfolio and/or Mutual Fund. The transfer is an exact ROI as varied every time trading value changes.

From the output of a Daily Data Base below for Each Component or Stock, the Percent is applied by multiplication to the Trading Value of each share as owned by the Portfolio/Mutual Fund. At the same time the resulting ROI dollars of OiBiTDA are divided by the Hourly Rate per Paid Hour ($22.36) also Benchmark #3 that calculate the Paid Hours for the shares (1000 below) as owned by the Portfolio/Mutual.

TABLE 5

| | B | C | D | E | F | G |
|---|---|---|---|---|---|---|
| 73 | 0.602 | Os Shares Bil | Shares Owned | 1,000 | 375.0 | $22.36 |
| 74 | $32.48 | Trade Value | $1,680 | $32,480 | $8,385 | 25.8% |
| 75 | Value $$ | EPS Earn $$ | Income Tax | Interest (net) | Depreciation | OiBiTDA $$ |
| 76 | $4,888 | $0.661 | $(0.296) | $0.370 | $0.527 | $1.262 |
| 77 | Caterpillar | 1,909 | Tell Tale Ratio | Inv. Tr per Hr | $22.36 | ROI |
| 78 | employees | 112,887 | | Trading Value per Hr | $86.60 | 25.8% |
| 79 | Hours | 56,443,500 | Dividend | EPH per Hr | $11.71 | 13.5% |
| 80 | Sales | $12.923 | $1.68 | $0.253 | 4.48 | 5.0 |

Individual stock transparency $22.36 L 35 (below) as the divisor of OiBiTDA Dollars feeds the Paid Hour accumulation along with those of Trading Value to give Portfolio/Mutual/Hedge Collection its very own OiBiTDA ROI at an Average Rate per Paid Hour—Caterpillar plus Four other Stocks: AXP, GOOG, XOM, YHOO at Apr. 23, 2009 comprise such a collection with an ROI of 16.2% from a Bx 3 of $57.79 better than that of all Outstanding Shares at 15.3%. Both Bx Rates and ROI will vary daily and change in relation to each other depending on the Quantity and mix among the whole of shares.

TABLE 6

| | D | E | F | G | H | I | J | K | L | M |
|---|---|---|---|---|---|---|---|---|---|---|
| 33 | | enter | | | As Bx #3 is up-dated each Q by Corporation & Trade Value Weekly | | | | | |
| 34 | dividends | shares | 23-Apr | OE | inc tax | int | depr | OiBiTDA | Bx #3 | ROI |
| 35 | $33,600 | 20,000 | CAT | $0.661 | $(0.296) | $0.370 | $0.527 | $1.262 | $22.36 | 25.6% |
| 36 | $720 | 1,000 | AXP | $0.240 | $(0.038) | $0.483 | $0.174 | $0.859 | $26.03 | 12.2% |
| 37 | $— | 500 | GOOG | $0.382 | $0.453 | $— | $0.386 | $1.221 | $121.11 | 4.0% |
| 38 | $48,000 | 30,000 | XOM | $7.820 | $5.375 | $0.118 | $3.177 | $16.490 | $315.00 | 19.9% |
| 39 | $— | 50,000 | YHOO | $(0.303) | $0.107 | $— | $0.192 | $(0.004) | $(0.30) | -0.1% |
| 40 | | 101,500 | | | | | | Total | $19.828 | |
| 41 | | | | | Investor Transparency all OS Shares | | | | $124.96 | 15.3% |
| 42 | 2.3% | 101,500 | $3,626,805 | | | | Your Investor Transparency | | $57.79 | 16.2% |
| 43 | | per share | $35.73 | | Brackets for expenses are income items | | | | | |

As demonstrated by the Exact proportion for 1% of shares, 1,015 E 40 below.

TABLE 7

| | D | E | F | G | H | I | J | K | L | M |
|---|---|---|---|---|---|---|---|---|---|---|
| 34 | dividends | shares | 23-Apr | OE | inc tax | int | depr | OiBiTDA | Bx #3 | ROI |
| 35 | $336 | 200 | CAT | $0.661 | $(0.296) | $0.370 | $0.527 | $1.262 | $22.36 | 25.6% |
| 36 | $7 | 10 | AXP | $0.240 | $(0.038) | $0.483 | $0.174 | $0.859 | $26.03 | 12.2% |
| 37 | $— | 5 | GOOG | $0.382 | $0.453 | $— | $0.386 | $1.221 | $121.11 | 4.0% |
| 38 | $480 | 300 | XOM | $7.820 | $5.375 | $0.118 | $3.177 | $16,490 | $315.00 | 19.9% |
| 39 | $— | 500 | YHOO | $(0.303) | $0.107 | $— | $0.192 | $(0.004) | $(0.30) | -0.1% |
| 40 | | 1,015 | | | | | | Total | $19,828 | |
| 41 | | | | | Investor Transparency all OS Shares | | | | $124.96 | 15.3% |
| 42 | 2.3% | 1,015 | $36,268 | | | | Your Investor Transparency | | $57.79 | 16.2% |
| 43 | | per share | $35.73 | | Brackets for expenses are income items | | | | | |

Caterpillar was profiled in the Data Base for Quarter 1 Ended Mar. 31, 2009 May 12, 2009 via Yahoo regardless of the Trading Value of that day.

TABLE 8

|    | B | C | D | E | F | G |
|----|---|---|---|---|---|---|
| 73 | 0.60171 | Os Shares Bil | Shares Owned | 1,000 | 342.6 | $14.01 |
| 74 | $35.66 | Trade Value | $1,680 | $35,660 | $4,800 | 13.5% |
| 75 | Value $$ | EPS Earn $$ | Income Tax | Interest (net) | Depreciation | DNA $$ |
| 76 | $5,364 | $(0.112) | $(0.080) | $0.380 | $0.534 | $0.722 |
| 77 | Caterpillar | −6,446 | Tell Tale Ratio | DNA per Hr | $14.01 | ROI |
| 78 | employees | 103,078 | Trading Value per Hr | | $104.08 | 13.5% |
| 79 | Hours | 51,539,000 | Dividend | EPH per Hr | $(2.17) | −2.1% |
| 80 | Sales | $12.923 | $1.68 | $0.253 | 4.90 | 2.9 |

May 15, 2008—20,000 of Caterpillar Shares as part of a 5 Stock Collection Transparent at $39.77 per Hour L 44 with a ROI of 9.8%, less than its Hedge-Index, of 10.8%

TABLE 9

|    | D | E | F | G | H | I | J | K | L | M |
|----|---|---|---|---|---|---|---|---|---|---|
| 35 |   | enter |   | As Bx #3 is up-dated each Q by Corporation & Trade Value Weekly | | | | | | |
| 36 | dividends | shares | 15-May | OE | inc tax | int | depr | OiBiTDA | Bx #3 | ROI |
| 37 | $33,600 | 20,000 | CAT | $(0.112) | $(0.080) | $0.380 | $0.534 | $0.722 | $14.01 | 13.5% |
| 38 | $720 | 1,000 | AXP | $0.437 | $0.101 | $0.470 | $0.192 | $1.200 | $36.36 | 14.6% |
| 39 | $— | 500 | GOOG | $1.423 | $0.467 | $— | $0.423 | $2.313 | $228.76 | 7.2% |
| 40 | $50,400 | 30,000 | XOM | $4.550 | $3.148 | $0.107 | $2.793 | $10.598 | $202.45 | 12.3% |
| 41 | $— | 50,000 | YHOO | $(0.303) | $0.107 | $— | $0.192 | $(0.004) | $(0.30) | −0.1% |
| 42 |   | 101,500 |   |   |   |   | Total | $14.829 | | |
| 43 |   |   |   | Investor Transparency all OS Shares | | | | | $96.42 | 10.8% |
| 44 | 2.3% | 101,500 | $3,749,580 |   |   |   | Your Investor Transparency | | $39.77 | 9.8% |
| 45 |   | per share | $36.94 | Brackets for expenses are income items | | | | | | |

Ultimate Transparency below extends the arithmetic of the Provisional Patent Application by multiplying the Total Trading Value of any of stocks (see the DMA at end of this paper) by the ROI of the past Friday at the closing of the New York Stock Exchange. When the answer is divided by the Hours of the current OiBiTDA day's performance, Bx 3 the dollar and cent rate can be compared to that of the current day for the percent of change up or down.

Investor Transparency from the collection of Public. Equities generates an Ultimate Transparency in the form of a Common Measurement or barometer for change from the previous Friday as follows. Multiplying the ROI of the Previous Friday 14.8% V 44 by the day's Trading Value $3,749,580 T 35=$544,711/current U 42 Hours 9.235.1 V 35=$60.07 U 44 51.0% or $1,510.19 W 49 more than the current day's $1000.

TABLE 10

|    | S | T | U | V | W | X |
|----|---|---|---|---|---|---|
| 33 | Today's close | May 15, 2009 | | | | |
| 34 | Shares | Trading Value | OibiT SS | Hours | Dividends | $1,000 |
| 35 | 101,500 | $3,749,580 | $367,312 | 9,235.1 | $82,320 | Invested |
| 36 | Investor Transparency | | Bx #3 | ROI | Yield | Hours Owned |
| 37 | $36.94 | Per Share | $39.77 | 9.8% | 2.2% | 25.1 |
| 38 |   |   | Changes Daily | | | |
| 39 | All Outstanding Shares Hedge-Index % | | | 10.8% | | |
| 40 |   |   | last Friday | | | |
| 41 | Shares | Trading Value | OibiT $$ | | | |
| 42 | 101,500 | $3,787,370 | $554,711 | | | |
| 43 | Investor Transparency | | Bx #3 | ROI | | |
| 44 | $37.60 | Per Share | $60.07 | 14.8% | last Friday | |
| 45 | −1.8% | change | −51.0% | | | |
| 46 |   | the Portfolio above 101,500 Shares | | | | |
| 47 | $1000 Invested/U37 = Hours of OiBiTDA owned by Participants | | | | | |
| 48 |   | Today | 25.1 | $39.77 | $1,000.00 | |
| 49 | Today's Hours at Yesterday's | | 25.1 | $60.07 | $1,510.19 | −51.0% |

The same collection of Equities produced another change. Exxon-Mobile and its 50,000 Shares per its new profile of May 15 for Q 1 2009 at prior Friday's ROI, 19.0%×Trade Value $69.00=a 54.6% decline AH 63.

8) Different Organization Structures highly leveraged or not (as applicable)
9) the USA and abroad (only present if included by the Corporations (as applicable)

TABLE 11

|    | AC | AD | AE | AF | AG | AH |
|----|----|----|----|----|----|----|
| 47 | Today's close | May 15, 2009 | XOM | | | |
| 48 | Shares | Trading Value | OibiT $$ | Hours | | $1000 |
| 49 | 1,000 | $69,000 | $8,478 | 41.9 | | Invested |
| 50 | Investor Transparer | | Bx #3 | ROI | | Hours Owned |
| 51 | $69.00 | Per Share | $202.45 | 12.3% | | 4.9 |
| 52 | | | Changes Daily | | | |
| 53 | All Outstanding Shares Hedge-Index % | | 10.8% | | | |
| 54 | | | last Friday | | | |
| 55 | Shares | Trading Value | OibiT $$ | | | |
| 56 | 1,000 | $69,000 | $13,110 | | | |
| 57 | Investor Transparer | | Bx #3 | ROI | | |
| 58 | $68.84 | Per Share | $313.05 | 19.0% | last Friday | |
| 59 | 0.2% | change | −54.6% | | | |
| 60 | | | | | | |
| 61 | $1000 Invested/U37 = Hours of OiBiTDA owned by Participants | | | | | |
| 62 | | Today | 4.9 | $202.45 | $1,000.00 | |
| 63 | Today's Hours at Yesterday's | | 4.9 | $313.05 | $1,546.35 | −54.6% |

The World Wide Free Market Financial System must be in agreement as to the extent of change for a equal Time Frame with a Common Measurement among all Interested Parties before Reform and Accountability can take place.

Think of any stock or a composite of stocks in a Portfolio as $1000 of OiBiTDA Value. The $1000 that stays still each day, includes six daily actions or variables with two, price and quantity applicable to Trading Value. The Trading Value of the DJIA, as well as each stock and an Portfolio only includes one variable, with no regard for the quantity of Owned of Outstanding for each Corporation (10 billion for GE, 600 million for Caterpillar). The $1000 does not change; the past is adjusted via a common denominator—generating Ultimate Transparency.

From the above, no one needs clarification of $1000, Now an Investor will know the worth of his or her Investment on the previous Friday with the percent of change and the OiBiTDA ROI producing Common Criteria for buy, hold and sell decisions.

Continuing the chart above that ended with line 49 think of any stock or a composite of stocks in terms of Hour Ownership as Credited and Deposited within a Portfolio or Fund. An Investor will know the Cash Purchase and Redemption Value in the same breath because they are always equal on the same day—$39.77 as multiplied by random hours to equal $5,353, $1,754 or ½ the hours (25.1) that Equals $500, ½ of $1000 as proof.

TABLE 12

| S | T | U | V | W | X |
|---|---|---|---|---|---|
| 48 | Today | 25.1 | $39.77 | $1,000.00 | |
| 49 | Today's Hours at Yesterday's | 25.1 | $60.07 | $1,510.19 | −51.0% |
| 50 | This exposure to any collection of Equities precludes all Madoffs | | | | |
| 51 | as the detail for any combination via a web-site. The participant knows both | | | | |
| 52 | the entrance to or exit from the Fund | | $39.77 | the multiplier | |
| 53 | Accumulated Hrs. Credited | 134.6 | $5,353 | Check to Participant | |
| 54 | | 44.1 | $1,754 | less handling if desired | |
| 55 | 50% of U48 | 12.6 | $500 | Proof ½ of $1000 | |

The Free Market System that moves all World Wide. Stocks as well as any collection of Stocks should not have a Face with only one Variable. The Nine, Variable Face of my Patent Pending Technology recommended for all Investors in a Weekly Time Frame (versus the previous Friday as presented) are:

1) The price as traded on the NYSE, (daily & during each week)
2) The Quantity as Shares Owned, (always within different collections of stocks)
3) The Quality of Shares owned as an ROI, (always with each day of trading)
4) The Dollars of OiBiTDA as owned, (when different Public Companies change their OiBiTDA results)
5) $1000 as a Constant Base for Every Day's Value (never)
6) Dividends per Share (not always shown), (as applicable)
7) Different Reporting Cycles & SEC submissions (as applicable, fiscal & calendar)

See the end this invention as applied to DJIA (Dow Jones Industrial Average).
Technology B, of A and B There are no wrong OiBiTDA (referred to as DNA in Provisional Patent application) results, only real time* answers as to how and why Quarterly Corporate results change from prior SEC submissions. By only adding or subtracting sales to 13 week moving averages of the Prior Quarter, totals always contain the resulting OiBiTDA dollars of the most recent 13 weeks. Real time DNA results here to fore untracked weekly by Corporations are expressed by the same Mutual Fund Score Keeper per Paid Hour as updated in the 13th week of each Quarter by new Quarterly results actually submitted to the SEC.

*Real Time is daily regarding Trading Value and at least weekly For Component Operating Performance for each Profile that floats from one quarter to the next with no past historical data necessary.

The amounts on line 4 Column D thru H are a repeat of chart 1 of this application for Caterpillar's OiBiTDA ($1,262)

per SEC via Yahoo for Quarter 4 2008. They are the Parameters for the OiBiTDA Dollars that will be produced for Q 1 2009 by Paid Hours 56.444 F 15 as divided by Sales Dollars of $12,923 F 16 made Equal to those to be Earned during current Q 1 at the rate of 0.00437 (G 15 below) for each Dollar of Sales.

TABLE 13

|   | D | E | F | G | H | I | J |
|---|---|---|---|---|---|---|---|
| 1 |   | Earned Hours © |   |   | millions |   | Market |
| 2 |   | In millions |   |   | Cash Profit Tell Tale |   | Value |
| 3 | EPS Earnings | Inc Tx | Interest | Depreciation | OiBiTDA | Ratio | per Hour |
| 4 | $661.0 | ($296.0) | $370.0 | $527.0 | $1,262.0 | 1.91 | $89.59 |
| 5 |   |   |   |   |   |   |   |
| 6 |   | Prior Q Sales |   | $12,923.0 | $229.0 | Bx #1 | Sales |
| 7 |   |   | Payroll | $3,000.0 | $53.15 | Bx #2 | Labor |
| 8 |   |   | OiBiTDA |   | $22.36 | Bx 3 per Hour |   |
| 9 |   |   | EPS/Operating Earn |   | $11.71 | Bx 4 per Hour |   |

Parameters are the weekly averages as divided by 13 weeks put into a 13 line Grid below starting on line 21.

TABLE 14

|    | A | B | C | D | E | F | G | H | I | J |
|----|---|---|---|---|---|---|---|---|---|---|
| 1  | 500 |  | 112,887 | 56443500 |  |  |  |  |  |  |
| 2  | People & Hrs per Q mll | 56.444 |  |  |  |  |  |  |  |  |
| 3  |  |  | Prior |  |  |  |  |  |  |  |
| 4  |  |  | Quarter |  |  |  |  |  |  |  |
| 5  | Units Sales prior Q |  | 11.748 |  |  |  |  |  |  |  |
| 6  | $1,100 | price per | Invoice |  |  |  |  |  |  |  |
| 7  | Hours for Q | 56.444 | Hrs Pr. Q. |  |  |  |  |  |  |  |
| 8  | wk's units | 0.904 |  |  |  |  |  |  |  |  |
| 9  | wk's hours | 4.342 |  |  |  |  |  |  |  |  |
| 10 | wk Cash Pr | $97.1 |  |  |  |  |  |  |  |  |
| 11 | wk Spend | $889.8 |  |  |  |  |  |  |  |  |
| 12 | Wk's Sales | $994.1 |  |  |  |  |  |  |  |  |
| 13 | Ave PR | $230.8 |  |  |  |  |  |  |  |  |
| 14 | OiBiTDA % | 9.8% |  | All the Data is connected by a quotient |  |  |  |  |  |  |
| 15 |  |  |  | sales will earn hours |  | 56.444 | 0.00437 |  |  |  |
| 16 |  |  |  | for every Dollar sold |  | $12,923.0 |  |  |  |  |
| 19 |  |  |  | Hours Paid |  |  | Hours Earned |  |  | with fringes |
| 20 | Week # | Sales | Units | Per Unit | Cash Profit |  |  | Price Var | Vol Var | Payroll $$ |
| 21 | 1 | $994.1 | 0.904 | $1,100.00 | 4.34 | $97.1 | 4.342 | $— | $— | $230.8 |
| 22 | 2 | $994.1 | 0.904 | $1,100.00 | 4.342 | $97.1 | 4.342 | $— | $— | $230.8 |

An important part of the invention is to create a grid with these headings where week # (week of the quarter), with Sales (for the week), Units (units sold or transactions or invoices per week), Per Unit (sales divided by units, Hours Paid (employee hours), Cash Profit (OiBit Dollars), Hours Earned (sales and/units), Price Var (price variances verses the prior quarter), Vol Var (volume variances verses the last quarter), with fringes Payroll$$ (payroll dollars with or without fringe benefits)

As Earmarked by Four Benchmarks above.
Bx 1 Sales per Hour $229.00—H 6
Bx 2 Labor Cost per Hour $53.15—H 7
Bx 3 OiBiTDA per Hour $22.36—H 8
Bx 4 Earnings per Share per Hour $11.71—H 9

For the purposes of this presentation Sales Dollars were recorded using the 12 week averages for each column. Such 12 weeks were adjusted in week 13 in B 33 to equal $9,225 as submitted to the SEC including a new head count that produced 51.539 E 34 Paid Hours. This arithmetic is intended to be the exact procedure and why there are no wrong amount only answers. The answers are generated by Sales Dollars $9,225 B 34×0.00437 that Earned 40.292 G 34 Hours 78.2% of Paid as submitted to the SEC for Quarter 2 2009 for an ROI at 13.5% for the Trading Value of May 15 also above.

TABLE 15

| | B | C | D | E | F | G | H | I | J | K |
|---|---|---|---|---|---|---|---|---|---|---|
| 33 | ($2,703.9) | 0.904 | $(2,992.01) | 4.342 | $(442.9) | (11.810) | $(3,698.0) | $— | $(500.0) | 13 |
| 34 | $9,225.0 | 11.748 | $785.23 | 51.539 | $722.0 | 40.292 | $(3,698.0) | $— | $2,269.2 | Pay $$ |
| 35 | per Earned Hour | | The Growth Certifier | | 78.2% | per Paid Hr | | | $44.029 | |
| 36 | $228.95 | | $178.99 | Bx #3 | $14.01 | | per Earned | | $56.320 | |
| 37 | spending | $8,503 | Per Hour Trade Value | | $104.08 | 13.5% | difference | | $12.290 | |
| 38 | | | | | | | | | 21.8% | |

As accounted for by the Hours Paid versus those Earned during the Quarter from the dollar deviation to Sales $3,698 J 44 less, and OiBiTDA $540.0 J 52 less versus the Parameters of column G set from the prior Quarter.

TABLE 16

| | F | G | H | I | J |
|---|---|---|---|---|---|
| 39 | | Agreement) Sales Analysis for last 13 weeks by the Hr. | | | |
| 40 | Sales | Price | Vs. | Volume | |
| 41 | | Parameters | 13 weeks | | |

TABLE 16-continued

| | F | G | H | I | J |
|---|---|---|---|---|---|
| 42 | Price | $228.95 | $228.95 | 40.292 | $0.000 |
| 43 | Volume | 56.444 | 40.292 | $228.95 | $(3,698) |
| 44 | Sales | $12,923.0 | Sales $$ | $9,225.0 | $(3,698) |
| 45 | | | | | |
| 46 | | | | | |
| 47 | OBITDA | | For last 13 weeks by the Paid Hour | | |
| 48 | | | Vs. | | Sales/Spend |
| 49 | | Parameters | 13 Weeks | | Efficiency |
| 50 | DNA | $22.36 | $14.01 | 51.539 | $(430.3) |
| 51 | Hour + or − | 56.444 | 51.539 | $22.36 | $(109.7) |
| 52 | | $1,262.0 | Perf. Cash | $722.0 | $(540.0) |
| 53 | | 9.8% | OiBi % of Sales | | 14.6% |
| 54 | Hour | | in this case negative sales | | |

As also accounting for less EPS Dollars $603.7 by Paid Hours 51.539.

TABLE 17

| | B | C | D | E | F |
|---|---|---|---|---|---|
| 53 | Parameters | | | | |
| 54 | | | Operating | Earnings by the Paid Hour | |
| 55 | EPS | | $11.71 | ($0.00) | 51.539 | $(603.7) |
| 56 | Hour Change | | 56.444 | 51.539 | ($0.00) | $0.0 |
| 57 | | | $661.0 | Per. Cash | $(0.112) | $(603.7) |

As reconciled to Trading Value by the Sales Spending Efficiencies of for both ROIs of . . . OiBiTDA $430,319 (D 63 & J 50) above) 13.5% . . . and an EPS loss (0.002%) D71 &F 55

TABLE 18

| | C | D | E | F | G | H |
|---|---|---|---|---|---|---|
| 59 | | | | OiBiTDA Efficiency | | |
| 60 | | | A Reconciliation by the Rate per Paid Hour to Trading Value | | | |
| 61 | | Trading Value | $104.08 | Per Hour | Last Quarter | |
| 62 | | OiBiTDA | $14.01 | 13.5% | $22.36 | -37.3% |
| 63 | | $(430.319) Sales/Spending | | | | |
| 64 | Paid Hrs | 51.539 | $(8.35) | $22.36 | Current Quarter | |
| 65 | | | Per Hour | | | |
| 66 | | | | | | |
| 67 | | | | EPS Efficiency | | |
| 68 | | | A Reconciliation by the Rate per Paid Hour to Trading Value | | | |
| 69 | | Trading Value | $104.08 | Per Hour | Last Quarter | |
| 70 | | EPS | $(0.00) | -0.002% | $11.71 | -100.0% |
| 71 | | $(603.676) Sales/Spending | | | | |
| 72 | Per Hour | 51.539 | $(11.71) | $11.71 | Current Quarter | |
| 73 | | | Per Hour | | | |

The Power of this Standard Grid and its Hour Process is within the lines and averages for each week. The Grid is capturing the results as each new week is added for the most recent 13 weeks accumulated. Meaning—until the 13$^{th}$ week, the totals are using the actual weekly amounts how ever accumulated.

IN ADDITION, the feeder sheets for the Standard Program and Grid above are taking the Per Hour Rate of OiBiTDA results as extrapolated over the entire Quarter-thus predicting results for the Quarter for the actual being experienced. Who said cash flow can not be arithmetically predicted? Let alone traditional cash flow and OiBiTDA as it records ROI for Management and Shareholders.

TABLE 19

So Much from so Little

| | D | E | F | G |
|---|---|---|---|---|
| 14 | | All the Data is connected by a quotient | | |
| 15 | | sales will earn hours | 56.444 | 0.00437 |
| 16 | | for every Dollar sold | $12,923.0 | |

Earned Hours VS. Paid Hours $^{SM}$

The perfect way to measure one Quarter to the Next. There are no Results Only Answers That Tie into SEC Reporting. Last Quarter's Paid Hours divided by Last Quarter's Sale Dollars. Where the Last 13 weeks of a Grid=the Prediction for a Quarter Each Quarter

```
┌─────────────────────────────────────┐
│ Earned Hours Drive Unit Sales per Hour │
├──────────┬──────────────────────────┤
│ TWO      │                          │
│ Score    │                          │
│ Keepers  │ Paid Hours Drive OiBiTDA │
├──────────┤                          │
│ Can't Fool                          │
│ + or - 100%                         │
├──────────┬──────────────────────────┤
│ Each New Quarter │                  │
│   = 100%   │ Where Never in agreement │
└──────────┴──────────────────────────┘
```

Back to the Grid Regarding Benchmark #2 Labor Cost for the imposed Dollars of Caterpillar column J as divided by Paid Hours Col. E 51.539=$44.03 and Earned Col. G 40.902=$56.32 making the Paid Hour cost 21.8% less as a reciprocal to the sales efficiency at 78.2% to equal 100% in total at all times.

TABLE 20

|    | E        | F       | G           | H          | I  | J        | K       |
|----|----------|---------|-------------|------------|----|----------|---------|
| 34 | 51.539   | $722.0  | 40.292      | $(3,698.0) | $- | $2,269.2 | Pay $$  |
| 35 | Certifier| 78.2%   | per Paid Hr |            |    | $44.029  |         |
| 36 | Bx #3    | $14.01  |             | per Earned |    | $56.320  |         |
| 37 | Value    | $104.08 | 13.5%       | difference |    | $12.290  |         |
| 38 |          |         |             |            |    | 21.8%    |         |

The same unit efficiency and its 3 Benchmarks can be brought to every Operating Facility of a Public Corporation. The Hours Paid from the last Quarter to be Earned in the Current Quarter are from my manufacturing days before I became a Corporate Controller and owned a portion of an LBO from a prior NYSE Corporation about 25 years after becoming a NY CPA.

The Accounting Situation

Every step in the formation of a Financial Operating Statement for a Business is from rules and regulations when matching Cost with Revenue. Therein lays the apparent contradiction between Accounting for a business and businesses living from day to day from their OiBiTDA or Cash Profit and its ROI.

"East is East and West is West and never the twain shall meet" (Kipling)

Until Now—OiBiTDA or Operating Income before Income Tax, Interest, and Depreciation & Amortization is a familiar Accounting Term easily abstracted from a Quarterly Operating Statement. The Term is sometimes interchanged with Cash Flow and or Cash Profit as used by Financial Professionals. D'Amico titled and defined the same "make-up" in a 2003 book, Performance Cash. Since that date OiBiTDA became an abbreviated substitute for the term as used for the Universal Excel Grid in this Patent Application. D'Amico extended the scope of the term as a means to capture the Cash Profit from a Data Base Profile of each Public Corporation, while tying the amount into Quarterly SEC reports that are now Trading Value adjustable regardless of the daily variation as created by Traders.

May 22, 2009—8277

The Closing Value of the DJIA. Investor Transparency for the Investor=Ultimate Transparency for all Other Interested Parties The part of this invention is best exemplified by the Dow Jones Industrial Average (DJIA) for the closing amount on the New York Stock Exchange for Friday May 22, 2009 up 8 (0.1%) points from the close for the previous Friday at 8269 when $1000 was worth $1076.35 at the closing of May 15, 2009, a decline of 7.6% ($76.35/1000).

The DJIA only contains one accurate variable—the change from the previous week of 8 points. The DJIA itself at 8269 is void of all intelligence and detail to account for the 0.1% rise. That change is similar to a thermometer outside the NYSE building that tells no one of the different readings in California or anywhere else.

The Financial Free Market System needs a Face in the form of a change barometer common to all interest parties of which there are many: Corporate Management, Managers of Portfolios and Funds, Traders, Financial Analysts, The Federal Reserve, the SEC, Congress, The President and last and most important ones the World Over—those individuals who own Public Equities. ALL MUST BE SINGING TO THE SAME HYMNBOOK.

$1000 is the constant; all will know the percent deviation whether in Euros, Pesos or Yen. All will have a fixed $1000 along with its ROI percent to buy a Stock, buy into a Mutual Fund, or Invest in a Portfolio or Hedge Fund. When the $1000 is held or sold an Investor will know how much it is worth (less handling charges) and get a check if sold for that same amount. Last but not least, the owner will along with all other Interested Parties know how much the Equity Investment changed versus the prior Friday on the New York. Stock Exchange as supported by the Each Corporation's Pertbrmance as reported to the SEC for the most recent Quarter.

What follows are the Trading Values of the 30 Dow Industrial Stocks as documented by the Wall Street Journal for: a) the hypothetical Value of the DJIA, b) Portfolio of 8022 shares as could be in a collection of the 2 to 30 of the components. c) how much 13 of the 30 did truly change in Value for the week ended May 22 as a percent. d) how much Chevron a Dow Stock changed during the week ended May 22 as a percent of $1000.

a) the hypothetical Value of the DJIA—$1000 is down 7.6% from $1076.35

TABLE 21

|    | A                        | B                | C                             | D       | E          | F              |
|----|--------------------------|------------------|-------------------------------|---------|------------|----------------|
| 60 | The DJIA                 | 5/22 4:30 PM     | 8277                          | 8,269   | 8          | 0.1%           |
| 61 | Shares                   | Trading Value    | OibiT $$                      | Hours   |            | $1,000         |
| 62 | 93,582                   | $2,671.5         | $422.5                        | 14.480  |            | Invested       |
| 63 | Investor Transparency    |                  | Bx #3                         | ROI     |            | Hours Owned    |
| 64 | $28.55                   | Per Share        | $29.18                        | 15.8%   | ownership  | 34.3           |
| 65 |                          |                  | Subject to Change Daily       |         |            |                |
| 66 | All Outstanding Shares Hedge-Index % |      |                               | 15.8%   |            |                |
| 67 |                          |                  | Last Friday                   |         |            |                |
| 68 | Shares                   | Trading Value    | OiBiT $$                      |         |            |                |
| 69 | 93.602                   | 2,761.2          | 454.8                         |         |            |                |
| 70 | Investor Transparency    |                  | Bx #3                         | ROI     |            |                |
| 71 | $29.50                   | Per Share        | $31.41                        | 71.0%   | last Friday|                |
| 72 | −3.2%                    | wk's change      | −7.6%                         |         |            |                |
| 73 |                          |                  |                               |         |            |                |
| 74 |                          |                  |                               |         |            |                |
| 75 |                          | Today            | 34.3                          | $29.18  | $1,000.00  | vs. Fri. Close |
| 76 | Today at Friday's ROI    |                  | 34.3                          | $31.41  | $1,076.35  | −7.6%          |
| 77 | last OiBiT season 3/12   |                  | 34.3                          | $37.32  | $1,279.05  | −21.8%         |
| 78 | B 62 $$$$                |                  | $422.5                        | $540.5  | @20.23%    | −21.8%         | b) a Portfolio 8022 shares as could be in a collection of the 30-S1000 is down 26.9%. from $1269.02.

TABLE 22

| | A | B | C | D | E | F |
|---|---|---|---|---|---|---|
| 80 | Today's Dow | 5/22 4:30 PM | 8277 | | | |
| 81 | Shares | Trading Value | OibiT $$ | Hours | Dividends | $1,000 |
| 82 | 8,022 | $310,629 | $55,583 | 1,036.4 | $13,091 | Invested |
| 83 | Investor Transparer | | Bx #3 | ROI | Yield | Hours Owned |
| 84 | $38.72 | Per Share | $53.63 | 17.9% | 4.2% | 18.6 |
| 85 | | | Changes Daily | | | |
| 86 | All Outstanding Shs. Hedge-Index % | | | 15.8% better/worse to | | 17.9% |
| 87 | | | Last Friday | | | |
| 88 | Shares | Trading Value | Oibit $$ | | | |
| 89 | 8,022 | $327,876 | $70,536 | | | |
| 90 | Investor Transparer | Bx #3 | ROI | | | |
| 91 | $40.87 | Per Share | $68.06 | 22.7% | last Friday | |
| 92 | −5.3% | wk's change | −26.9% | | | |
| 93 | | | | | | |
| 94 | $1000 Invested/F84 = Hours of OiBiTDA owned by Participants | | | | | |
| 95 | | Today | 18.6 | $53.63 | $1,000.00 | vs. Fri Close |
| 96 | Today at Friday's ROI | | 18.6 | $68.06 | $1,269.02 | −26.9% |
| 97 | This exposure to any collection of Equities precludes all Madoffs | | | | | |
| 98 | as the detail for any combination via a web-site. The participant knows both | | | | | |
| 99 | the entrance to or exit from the Fun | | | $53.63 | the multiplier | |
| 100 | Accumulated Hours Credited | | 134.6 | $7,218 | Check to Participant | |
| 101 | | | 44.1 | $2,365 | less handling if desired | |
| 102 | | 50% of U45 | 9.3 | $500 | Proof ½ of $1000 | | c) How much 13 of the 30 did truly change in Value for the week ended May 22 as a percent—S1000 is up and down at variable percent for 12 of Dow 30. AT&T, Kraft, Coca C, GE, Chevron, Intel, John J, McDonald, Microsoft, Merck Proctor, United T, and 3M with their new and respective RO. (Pfizer had an Outstanding Share adjustment)

Another 5 had their changes from the last Earning Season (Mar. 12, 2009) recorded prior to the week ended May 22: Amer. Exp, Caterpillar, Exxon, Home D.

TABLE 23

| | AV | AW | AX | AY | AZ | BA | BB | BC | BD |
|---|---|---|---|---|---|---|---|---|---|
| 1 | | | | | | | | OiBITDA | |
| 2 | Invest | Invest | $1,000 | changes | Last Friday | OiBITDA | first OiBlt | change | Exceed |
| 3 | Trans | Trans | Inv. Trans | this 10/30 | vs Today's | Final | season | per Profiles | Hedge-index |
| 4 | After | Before | for wk | Quarter | $1,000 | Q1 09 | 2009 | | 15.8% |
| 5 | $72.44 | $64.00 | 11.6% | AT & T | $884 | 30.5% | 1 | 1.119 | 1 |
| 6 | $(23.01) | $(23.01) | | Alcoa | na-loss | | | 0 | |
| 7 | $13.63 | $13.63 | 0.0% | Bk of Amer | $1,000 | 9.5% | | 0 | |
| 8 | $36.36 | $36.36 | 0.0% | Amer EX | $1,000 | 17.5% | 2 | 0.341 | 2 |
| 9 | $30.22 | $12.52 | 58.6% | KRAFT | $414 | 15.8% | 3 | 0.836 | |
| 10 | $(3.76) | $(3.76) | | Boeing | na-loss | | | 0 | |
| 11 | $14.01 | $14.01 | 0.0% | Caterpillar | $1,000 | 14.0% | 4 | -0.54 | |
| 12 | $(199.9) | $(199.9) | | CITI G | na-loss | | | 0 | |
| 13 | $47.01 | $34.39 | 26.9% | Coca C | $731 | 8.0% | 5 | 0.616 | |
| 14 | $(16.73) | $(16.73) | | Dupont | na-loss | | | 0 | |

TABLE 23-continued

| | | | | | | | | | |
|---|---|---|---|---|---|---|---|---|---|
| 15 | $202.45 | $202.45 | 0.0% | ExxonM | $1,000 | 12.6% | 6 | -5.892 | |
| 16 | $64.87 | $71.24 | -9.8% | GE | $1,098 | 30.2% | 7 | -1.171 | 3 |
| 17 | $(89.68) | $(89.68) | | GM | na-loss | | | 0 | |
| 18 | $23.10 | $23.10 | 0.0% | Hewlett P | $1,000 | 18.1% | 8 | -0.108 | 4 |
| 19 | $180.03 | $302.43 | -68.0% | Chervon | $1,680 | 18.7% | 9 | -3.798 | 5 |
| 20 | $5.03 | $5.03 | 0.0% | Home D | $1,000 | 5.4% | 10 | -1.279 | |
| 21 | $35.70 | $35.70 | 0.0% | IBM | $1,000 | 21.4% | | 0 | 6 |
| 22 | $45.27 | $37.85 | 16.4% | Intel | $836 | 9.0% | 11 | 0.311 | |
| 23 | $91.41 | $73.16 | 20.0% | John & J | $800 | 14.4% | 12 | 1.083 | |
| 24 | $8.88 | $9.18 | -3.4% | McDonald | $1,034 | 11.3% | 13 | -0.015 | |
| 25 | $103.60 | $136.77 | -32.0% | Microsoft | $1,320 | 10.7% | 14 | -15.09 | |
| 26 | $74.55 | $74.55 | 0.0% | Morgan C | $1,000 | 26.3% | | 0 | 7 |
| 27 | $81.78 | $82.24 | -0.6% | Merck | $1,006 | 16.3% | 15 | -0.202 | 8 |
| 28 | $57.56 | $54.36 | 5.5% | Pfizer | $1,000 | 9.3% | | 0 | |
| 29 | $66.32 | $101.93 | -53.7% | Proctor G | $1,537 | 11.9% | 16 | -2.457 | |
| 30 | $13.26 | $18.55 | -39.9% | United T | $1,399 | 12.3% | 17 | -0.59 | |
| 31 | $53.04 | $53.04 | 0.0% | Verizon | $1,000 | 29.6% | | 0 | 9 |
| 32 | $6.72 | $6.72 | 0.0% | Wal*Mart | $1,000 | 14.6% | | 0 | |
| 33 | $24.91 | $24.91 | 0.0% | Walt Dis | $1,000 | 17.0% | | 0 | 10 |
| 34 | $27.10 | $28.49 | -5.1% | 3M | $1,051 | 11.0% | 18 | -0.013 | |
| 35 | | | | | | | | | |
| 36 | | | -7.6% | DOW 30 | $1,076.3 | 15.8% | | | | d) How much Chevron a Dow Stock changed during the week ended May 22 as a percent—$1000 is down 68.0% from $1679.89.

TABLE 24

| | AQ | AR | AS | AT | AU | AV | AW |
|---|---|---|---|---|---|---|---|
| 40 | Today's close | 5/22 4:30 PM | Chevron | $64.62 | Trade Value Today | | |
| 41 | Shares | Trading Value | OibiT $$ | Hours | | $1,000 | |
| 42 | 1,000 | $64,440 | $12,062 | 67.0 | Invested | | |
| 43 | Investor Transparer | | Bx #3 | ROI | Hours Owned | | |
| 44 | $64.44 | Per Share | $180.03 | 18.7% | 5.6 | | |
| 45 | | | Changes Daily | | | | |
| 46 | All Outstanding Shares Hedge-Index % | | | 15.8% | | | |
| 47 | | Previous Friday | | | | | |
| 48 | Shares | Trading Value | OibiT $$ | | | | |
| 49 | | | | | | | |
| 50 | Investor Transparer | | Bx #3 | ROI | | | |
| 51 | | Per Share | $302.43 | Previous Friday | | | |

TABLE 24-continued

| | AQ | AR | AS | AT | AU | AV | AW |
|---|---|---|---|---|---|---|---|
| 52 | | change | -68.0% | | | | |
| 53 | | | | | | | |
| 54 | $1000 Invested/U44 = Hours of OiBiTDA owned by Participants | | | | | | |
| 55 | | Today | 5.6 | $180.03 | $1,000.00 | | |
| 56 | Today's Fri. ROI | Hrs | 5.6 | $302.43 | $1,679.89 | -68.0% | |

There can be no more managers of Madoff frame and no government regulations will be necessary with this Face of the Free Market System. On a Daily Basis in the hands of a prominent Media source all can be done as I immediately do from Trading Values of 30 Dows during each Day via www.OiBiTDA.com.—The first giant step to accountability and reform for which everyone seems to be clamoring.

For the new face for the free market system $1000 as Divided by a Common Denominator. Readily Transparent & Publishable Daily for Every Investor In a Stock, a Portfolio, a Mutual Fund, a Hedge Fund. That along with an ROI for the Same Hourly Rate Generates Common Criteria for Every Buy, Hold & Sell Decision. Documentation Sheets for Word Follow

TABLE 25

|    | B          | C            | D              |
|----|------------|--------------|----------------|
| 73 | 0.602      | Os Shares Bil| Shares Owned   |
| 74 | $32.48     | Trade Value  | $1,680         |
| 75 | Value $$   | EPS Earn $$  | Income Tax     |
| 76 | $4,888     | $0.661       | $(0.296)       |
| 77 | Caterpillar| 1.909        | Tell Tale Ratio|
| 78 | employees  | 112,867      | Trading Value  |
| 79 | Hours      | 56,443,500   | Dividend       |
| 80 | Sales      | $12,923      | $1.68          |

Sales $12,923 ESP $0.661 OiBiTDA $1.262 Caterpillar

TABLE 26

|    | D              | E                | F            | G       |
|----|----------------|------------------|--------------|---------|
| 73 | Shares Owned   | 1,000            | 375.0        | $22.36  |
| 74 | $1,680         | $32,480          | $6,385       | 25.8%   |
| 75 | Income Tax     | Interest(net)    | Depreciation | DNA SS  |
| 76 | $(0.296)       | $0.370           | $0.527       | $1.262  |
| 77 | Tell Tale Ratio| DNA per Hr       | $22.36       | ROI     |
| 78 |                | Trading Value per Hr | $86.60   | 25.8%   |
| 79 | Dividend       | EPH per Hr       | $11.71       | 13.5%   |
| 80 | $1.68          | $0.253           | 4.48         | 5.0     |

Page 2 Caterpillar $1.262 Bx #3 $22.36, 1000 Shares

TABLE 27

|    | K           | L       | M     |
|----|-------------|---------|-------|
| 34 | OiBiTDA     | Bx #3   | ROI   |
| 35 | $1.262      | $22.36  | 25.6% |
| 36 | $0.859      | $26.03  | 12.2% |
| 37 | $1.221      | $121.11 | 4.0%  |
| 38 | $16.490     | $315.00 | 19.9% |
| 39 | $(0.004)    | $(0.30) | −0.1% |
| 40 | $19.828     |         |       |
| 41 | shares      | $124.96 | 15.3% |
| 42 | Transparency| $57.79  | 16.2% |

Page 3 Caterpillar $1.262 Bx #3 22.36, 200 Shares

TABLE 28

|    | D         | E      | F      | G        |
|----|-----------|--------|--------|----------|
| 33 |           | enter  |        | As Bx #3 |
| 34 | dividends | shares | 23-Apr | OE       |
| 35 | $336      | 200    | CAT    | $0.0661  |
| 36 | $7        | 10     | AXP    | $0.240   |
| 37 | $—        | 5      | GOOG   | $0.382   |
| 38 | $480      | 300    | XOM    | $7.820   |
| 39 | $—        | 500    | YHOO   | $(0.303) |
| 40 |           | 1,015  |        |          |

Page 3 Continued Caterpillar Mar. 31, 2009
OiBiTDA $0.722 Bx #3 $14.01

TABLE 29

|    | B          | C            | D              | E                | F            | G       |
|----|------------|--------------|----------------|------------------|--------------|---------|
| 73 | 0.60171    | Os Shares Bil| Shares Owned   | 1,000            | 342.6        | $14.01  |
| 74 | $34.31     | Trade Value  | $1,680         | $34,310          | $4,800       | 14.0%   |
| 75 | Value $$   | EPS Earn $$  | Income Tax     | Interest (net)   | Depreciation | DNA $$  |
| 76 | $5,161     | $(0.112)     | $(0.080)       | $0.380           | $0.534       | $0.722  |
| 77 | Caterpillar| −6,446       | Tell Tale Ratio| DNA per Hr       | $14.01       | ROI     |
| 78 | employees  | 103,078      |                | Trading Value per Hr | $100.14  | 14.0%   |
| 79 | Hours      | 51,539,000   | Dividend       | EPH per Hr       | $(2.17)      | −2.2%   |
| 80 | Sales      | $12.923      | $1.68          | $0.253           | 4.90         | 2.9     |

Page 4 Price per Share Wall Street Journal May 15 at close DJIA at 8269 . . . Page 5 Price per share $36,94. Exxon Page 6 . . . & Page 7 Page 8 thru 11 at $35.66 per share for Caterpillar

TABLE 30

|    | B        | C         | D         | E      | F         |
|----|----------|-----------|-----------|--------|-----------|
| 35 | Trading  | Fund      |           | enter  |           |
| 36 | Value    | Value     | dividends | shares | 15-May    |
| 37 | $35.66   | 713,200   | $33,600   | 20,000 | CAT       |
| 38 | $24.24   | 24,240    | $720      | 1,000  | AXP       |
| 39 | $390.28  | 195,140   | $—        | 500    | GOOG      |
| 40 | $69.00   | 2,070,000 | $50,400   | 30,000 | XOM       |
| 41 | $14.94   | 747,000   | $—        | 50,000 | YHOO      |
| 42 |          | 3,749,580 |           | 101,500|           |
| 43 | per share| $36.94    |           |        |           |
| 44 |          |           | 2.3%      | 101,500| $3,749,580|

Page 14 to the End Wall Street Journal Dated May 22, 2009 at its DJIA Close 8277, a 7.6% decline per the Excel File.

TABLE 31

|    | A | B | C | D | E | F |
|---|---|---|---|---|---|---|
| 60 | The DJIA | 5/22 4:30 PM | 8277 | 8,269 | 8 | 0.1% |
| 61 | Shares | Trading Value | OibiT $$ | Hours | | $1,000 |
| 62 | 93.582 | $2,671.5 | $422.5 | 14.480 | | Invested |
| 63 | Investor Transparency | | Bx #3 | ROI | | Hours Owned |
| 64 | $28.55 | Per Share | $29.18 | 15.8% | ownership | 34.3 |
| 65 | | | Subject to Change Daily | | | |
| 66 | All Outstanding Shares Hedge-Index % | | | 15.8% | | |
| 67 | | | Last Friday | | | |
| 68 | Shares | Trading Value | OibiT $$ | | | |
| 69 | 93.602 | 2,761.2 | 454.8 | | | |
| 70 | Investor Transparency | | Bx #3 | ROI | | |
| 71 | $29.50 | Per Share | $31.41 | 17.0% | last Friday | |
| 72 | −3.2% | wk's change | −7.6% | | | |
| 73 | | | | | | |
| 74 | | | | | | |
| 75 | | Today | 34.3 | $29.18 | $1,000.00 | vs. Fri. Close |
| 76 | Today at Friday's ROI | | 34.3 | $31.41 | $1,076.35 | −7.6% |
| 77 | last OiBiT season 3/12 | | 34.3 | $37.32 | $1,279.05 | −21.8% |
| 78 | B 62 $$$$ | | $422.5 | $540.5 | @20.23% | −21.8% |

With the Detail by Stock versus May 15, 2009 and the changes for the Last Week Per Yahoo per the Excel File included.

TABLE 32

|    | AU | AV | AW | AX | AY | AZ | BA | BB | BC | BD |
|---|---|---|---|---|---|---|---|---|---|---|
| 2 | Today's | Innvest | Invest | $1,000 | changes | Last Friday | OiBITDA | first OiBlt | change | Exceed |
| 3 | Trade | Trans | Trans | Inv. Trans | this 18/30 | vs Today's | Final | season | per Profiles | Hedge-index |
| 4 | After | After | Before | for wk | Quarter | $1,000 | Q1 09 | 2009 | | 15.8% |
| 5 | $7,897 | $72.44 | $64.00 | 11.6% | AT & T | $884 | 30.5% | 1 | 1.119 | 1 |
| 6 | | $(23.01) | $(23.01) | | Alcoa | na-loss | | | 0 | |
| 7 | $1,052 | $13.63 | $13.63 | 0.0% | Bk of Amer | $1,000 | 9.5% | | 0 | |
| 8 | $4,103 | $36.36 | $36.36 | 0.0% | Amer EX | $1,000 | 17.5% | 2 | 0.341 | 2 |
| 9 | $4,030 | $30.22 | $12.52 | 58.6% | KRAFT | $414 | 15.8% | 3 | 0.836 | |
| 10 | | $(3.76) | $(3.76) | | Boeing | na-loss | | | 0 | |
| 11 | $4,800 | $14.01 | $14.01 | 0.0% | Caterpillar | $1,000 | 14.0% | 4 | -0.54 | |
| 12 | | $(199.9) | $(199.9) | | CITI G | na-loss | | | 0 | |
| 13 | $3,761 | $47.01 | $34.39 | 26.9% | Coca C | $731 | 8.0% | 5 | 0.616 | |
| 14 | | $(16.73) | $(16.73) | | Dupont | na-loss | | | 0 | |

TABLE 32-continued

| | | | | | | | | | |
|---|---|---|---|---|---|---|---|---|---|
| 15 | $8,687 | $202.45 | $202.45 | 0.0% | ExxonM | $1,000 | 12.6% | 6 | -5.892 | |
| 16 | $3,957 | $64.87 | $71.24 | -9.8% | GE | $1,098 | 30.2% | 7 | -1.171 | 3 |
| 17 | | $(89.68) | $(89.68) | | GM | na-loss | | | 0 | |
| 18 | $6,180 | $23.10 | $23.10 | 0.0% | Hewlett P | $1,000 | 18.1% | 8 | -0.108 | 4 |
| 19 | $12,062 | $180.03 | $302.43 | -68.0% | Chervon | $1,680 | 18.7% | 9 | -3.798 | 5 |
| 20 | $1,238 | $5.03 | $5.03 | 0.0% | Home D | $1,000 | 5.4% | 10 | -1.279 | |
| 21 | $21,654 | $35.70 | $35.70 | 0.0% | IBM | $1,000 | 21.4% | | 0 | 6 |
| 22 | $1,359 | $45.27 | $37.85 | 16.4% | Intel | $836 | 9.0% | 11 | 0.311 | |
| 23 | $7,862 | $91.41 | $73.16 | 20.0% | John & J | $800 | 14.4% | 12 | 1.083 | |
| 24 | $6,458 | $8.88 | $9.18 | -3.4% | McDonald | $1,034 | 11.3% | 13 | -0.015 | |
| 25 | $2,119 | $103.60 | $136.77 | -32.0% | Microsoft | $1,320 | 10.7% | 14 | -15.09 | |
| 26 | $9,059 | $74.55 | $74.55 | 0.0% | Morgan C | $1,000 | 26.3% | | 0 | 7 |
| 27 | $4,279 | $81.78 | $82.24 | -0.6% | Merck | $1,006 | 16.3% | 15 | -0.202 | 8 |
| 28 | $1,359 | $57.56 | $54.36 | 5.5% | Pfizer | $1,000 | 9.3% | | 0 | |
| 29 | $6,290 | $66.32 | $101.93 | -53.7% | Proctor G | $1,537 | 11.9% | 16 | -2.457 | |
| 30 | $6,280 | $13.26 | $18.55 | -39.9% | United T | $1,399 | 12.3% | 17 | -0.59 | |
| 31 | $8,527 | $53.04 | $53.04 | 0.0% | Verizon | $1,000 | 29.6% | | 0 | 9 |
| 32 | $7,196 | $6.72 | $6.72 | 0.0% | Wal*Mart | $1,000 | 14.6% | | 0 | |
| 33 | $4,039 | $24.91 | $24.91 | 0.0% | Walt Dis | $1,000 | 17.0% | | 0 | 10 |
| 34 | $6,181 | $27.10 | $28.49 | -5.1% | 3M | $1,051 | 11.0% | 18 | -0.013 | |
| 35 | | | | | | | | | | |
| 36 | | | | -7.6% | DOW 30 | $1,076.3 | 15.8% | | | |

For a Portfolio or Mutual Fund and the Patent Pending Transfer Process of ROI-12.2% & 7.0%-plus Bx #3-$144.17 & $60.00, the below chart (Table 33) is meant to convey the Variables of Investor Transparency (Bx #3) as it Common Denominator to 1000 and the resulting ROI and Flours Owned Amounts 195.7-293.5-158.2-80.2. For different stock ownership configurations The Eight Variables for Each of the Four Scenarios. The 2 different Quantities as owned by each of the Stock Holdings. The Outstanding Shares of Each Corporation 8.91 Billion & 1.4 Billion. The trading value of each stock $24.65 & $16.17 as of Oct. 5, 2009. The ROI percent of each stock 112% & 7.0%. The variables for any portfolio or fund would he the number of holdings (2×8–16) in the case (Table 33) below.

TABLE 33

| | | | Four Scenarios as Owned in a 2 stock Portfillo and/or Fund | | | |
|---|---|---|---|---|---|---|
| | | | Shares 1 | Shares 2 | Shares 3 | Shares 4 |
| 12.2% | Billion sh. | MFT | 3,000 | 4,500 | 20,000 | 2,222 |
| ROI | OS shares | 8.91 | | | | |
| | Trade Val. | $24.65 | $73,950 | $110,925 | $493,000 | $54,772 |
| 7.0% | | Yhoo | 9000 | 13500 | 1000 | 3333 |
| ROI | Trade Val. | $16.77 | $150,930 | $226,395 | $16,770 | $55,894 |
| | OS shares | 1.4 | | | | |
| | Trade Val. | Port/Fund | $224,880 | $337,320 | $509,770 | 110,667 |
| Msft Bx #3 | Inv. Trans. | $144.17 | $9,029 | $13,543 | $60,193 | $6,687 |
| Yhoo Bx #3 | Inv. Trans. | $60.00 | $10,491 | $15,737 | $1,166 | $3,885 |
| Sh 1- Bx #3 | Inv. Trans. | $99.76 | $19,520 | $29,281 | $61,359 | $10,573 |
| | ROI | Port/Fund | 8.68% | 8.68% | 12.04% | 9.55% |

TABLE 33-continued

Four Scenarios as Owned in a 2 stock Portfillo and/or Fund

|  | Shares 1 | Shares 2 | Shares 3 | Shares 4 |
|---|---|---|---|---|
| Hours Owned | 20.8 | 31.2 | 138.7 | 15.4 |
| Hours Owned | 174.9 | 262.3 | 19.4 | 64.8 |
| As the common denominator to $1000 | 195.7 | 293.5 | 158.2 | 80.2 |
| Bx #3 | $99.76 | $99.76 | $387.97 | $131.88 |
| same proportion of share holdings in Scenario 1 & 2 | $99.76 |  |  |  |
| OiBiTDA Value, Owned × Bx #3 | $19,520.38 | 29,280.58 | 61,358.76 | 10,572.77 |

Changes to the 8 variables with scenario 1 & 2 still in proportion to each other are shown in Table 34.

TABLE 34

Four Scenarios as Owned in a 2 stock Potfilio and/or Fund

|  |  |  | Shares 1 | Shares 2 | Shares 3 | Shares 4 |
|---|---|---|---|---|---|---|
| 17.0% | Billion sh. | MSFT | 2,000 | 3,000 | 15,000 | 7,777 |
| ROI | OS shares | 0.6 |  |  |  |  |
|  | Trade Val. | $22.00 | $44,000 | $66,000 | $330,000 | $171,094 |
| 5.5% |  | Yhoo | 8000 | 12000 | 2000 | 8888 |
| ROI | Trade Val. | $27.00 | $216,000 | 324,000 | $54,000 | $239,976 |
|  | OS shares | 2.5 |  |  |  |  |
|  | Trade Val. | Port/Fund | $260,00 | $390,000 | $384,000 | $411,070 |
| Msft Bx #3 | Inv. Trans. | $95.00 | $7,480 | $11,220 | $56,100 | $29,086 |
| Yhoo Bx #3 | Inv. Trans. | $75.00 | $11,880 | $17,820 | $2,970 | $13,199 |
| Sh 1- Bx #3 | Inv.Trans. | $107.88 | $19,360 | $29,040 | $59,070 | $42,285 |
|  | ROI | Port/Fund | 7.45% | 7.45% | 15.38% | 10.29% |
|  | Hours Owned |  | 21.1 | 31.6 | 157.9 | 81.9 |
|  | Hours Owned |  | 158.4 | 237.6 | 39.6 | 176.0 |
| As the common denominator to $1000 |  |  | 179.5 | 269.2 | 197.5 | 257.8 |
|  | Bx #3 |  | $107.88 | $107.88 | $299.10 | $163.99 |
| same proportion of shar holfings in Scenario 1 & 2 |  |  | $107.88 |  |  |  |
| OiBiTDA Value, Owned × Bx #3 |  |  | $19,360.00 | 29,040.00 | 59,070.00 | 42,284.66 |

The invention has many applications for using the novel benchmark calculations and ROI (return on investment) calculations.

Benchmark #1 Sales per Paid Hour and #3 OiBit per Paid Hour plus ROI criteria can be applied for comparison purposes among different Segments and/or Divisions of a Corporation for the benefit of Management, Shareholders, and the SEC for compliance to Sarbanes Oxley.

Benchmark #2 Payroll per Paid Hour plus negative ROI criteria can be applied for comparison purposes to every cost center (no sales) including research centers of a Corporation for the benefit of Management and Shareholders.

Benchmark #2 can be expanded to include different Classifications of Payroll cost including Fringe Benefits producing negative ROI criteria that can be applied for comparison purposes for Management, Shareholders, US Government Shareholders and the SEC. i.e. CEO Salaries, Officer Salaries Benchmark #2 can be used for accountability in meeting budget restraints for the benefit of oversight by legislative bodies including the US Government, State and Municipal Authorities.

Benchmark #1 Sales per Paid hour as allocated to different product lines for every sales facility of a corporation will measure the mix of actual sales by a price and volume analysis for the benefit of Management.

The Term "Hedge" Fund signifies that Fund management exercise risk by spreading investing over different Industrial Sectors that tend to rise and fall by sector in trading value during and at different stages of a business cycle. Because the Investor Transparency Process computes the ROI of a Portfolio/Fund in total as well for all outstanding shares of each stock owned—the Hedge Index Percent—(14.4%) and the resulting ROI Percent becomes the gauge by which to increase the actual ROI of the Portfolio/Fund (12.5% worse) by a proper allotment of quantity investments in higher ROI stocks of the Fund/Portfolio (15.3% vs. 16.2% better)

For Equity Corporation a complete reconciliation of Bx #3 by the Quantity Paid Hours plus its ROI and the efficiency of Hours Paid compare to the previous Quarter at all times.

For an Equity Corporation a complete reconciliation of Bx #4 ESP per Paid Hour by the Quantity of Paid Hours plus its ROI and the efficiency of Paid Hours compare to the previous Quarter at the End of Each Quarter.

For every Portfolio or Fund an accounting for the change of numerical Bx #3 compares to the previous Quarter at the end of each week at the Quantity Owned Level (−$28.66 & 12.5% vs. $39.57 & 18.7%) and at the Operating level of the Portfolio/Fund themselves. (page 14 $44.15 & 19.3% vs. $18.09 & 9.0%)

Based on the Dollar Ratio of Obit to EPS and the Published Annual estimate for a Year OiBit dollars are available for Stocks as divided the current Paid Hours to Project Bx #3 One Year Out for Comparison to the latest Quarterly Bx 3 to ascertain the OiBit change as a percent up or down in OiBit Value.

Because the 13 line standard Operating Grid and its weekly averages for all it variables, precisely records both OiBit Dollars and Traditional Cash Flow Dollars (accounts receivable collections are substituted for sales Dollars) the Quarterly totals are effectively a projection for both (OiBit & Traditional Cash Flow) all during the Quarter.

Calculating Roi of Each Operating Facility of Each Company

Every Equity Corporation that knows the Trading Value of its Outstanding Shares of Stock can bring every location or facility under the scrutiny of Investor Transparency—Benchmark #3 with its ROI (positive or negative)—by the use of a weekly Grid when each operation pays and/or earn hours and deposit cash in a bank and/or disburse cash—Because the Investment Base of the entire Corporation is also expressed as an overall Hourly Rate. i.e. Wal-Mart and Caterpillar (F37 $104.08 and G37 13.5%).

Because the Investment Base of the entire Corporation (company) is also expressed as an overall Hourly Rate, this invention allows each operation to record its own positive (could be better than or worse than that of the Equity Corporation) or negative percent. Negative would be caused by net OiBit Dollars for cash disbursed exceeding bank deposits.

The performance of separate operating facilities would include but is not limited to facilities such as Segments, Divisions, Groups, and Product Lines. branches, departments, retail outlets, cost centers, warehouses, research centers, expense classifications, and payroll classifications, and the like.

Such inclusions as percents for Segments, Divisions, Groups, and Product Lines can be compared to every other Equity Corporation and be used by the SEC to enact compliance to Sarbanes-Oxley.

An operating facility would be any subgroup of the company. For example, GM (General Motors) has separate factories, sales offices, warehouses, research centers, etc. An equity company would be any company having outstanding stock available to the public (a publicly held company).

The invention allows for methods and processes and systems that can derive ROI (return on investment) for all operating facilities of an equity company.

The novel method can include the steps of providing a publicly traded company having a publicly traded equity with outstanding shares of the equity, determining total employee hours of all employees of the company in a most recent quarter, determining total employees in each operating facility of the company, calculating an OiBit dollars by combining all cash into the company with all cash out of the company, calculating a quarter value of the company by multiplying all outstanding shares in the company by daily trading value of the equity, divided by 4, calculating a return on investment percentage (ROI) in cash profits of the company by dividing the OiBit dollars by the quarter value of the company, calculating an OiBit numerical benchmark of the company by dividing the OiBit dollars by the total employee hours of the company in the quarter, calculating the hourly rate of the quarter value of the company by dividing the quarter value of the company by the total employee hours in the quarter, calculating a net dollars for each facility of the company by combining all cash into and out of each facility for the quarter, calculating a separately hourly rate of the quarter for each facility of the company by dividing the net dollars of each facility by total hours paid to employees of each facility, and calculating separate ROIs for each facility by dividing the separately hourly rate of each facility by the hourly rate of the quarter value of the company, wherein performance each operating facility is represented in positive and negative values. OiBit dollars is calculated by combining quarterly earnings per common share dollars applicable to common shares, with quarterly income tax expenses and interest expenses and quarterly depreciation and amortization expenses of the publicly traded company The invention can calculate and determine the return on investment dollars of each company and include calculating current return on investments to the exact number of stocks. The invention also is capable of measuring change of return on the equity investments.

The invention includes methods and systems for calculating performance of equity investments, such as but not limited to public stocks, portfolios of those stocks, portfolios, mutual funds, hedge funds, in order for an investor to make informed decisions in realtime on acquiring and/or divesting of these equity investments, by calculating through a computer OiBiTDA (operating income before interest, tax, depreciation and amortization) of each equity investment which takes into account variables that include sales data per week, number of hours of paid salary people and hourly people.

The invention can include a website with a computer for inputting data from quarterly reports, and for dissemination through media such as but not limited to a website and other digital media to individual personal computers, cellular phones, and other types of handheld devices, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A method for calculating performance of stock investments between publicly traded companies, with a computer, comprising the
steps of:
calculating Oibit dollars of each of a first publicly traded company and a second publicly traded company by a computer, by combining all quarterly earnings per common share dollars applicable to common shares, with quarterly income tax expenses, with quarterly interest expenses, with quarterly depreciation and amortization expenses of each company respectively; wherein the Oibit dollars are the operating income before interest and tax dollars;
calculating an OiBit quarterly dollar benchmark for the first publicly traded company, by the computer, by dividing the Oibit dollars of the first publicly traded company by total employee hours of the first publicly traded company in a quarter;
calculating an OiBit quarterly dollar benchmark for the second publicly traded company, by the computer, by dividing the Oibit dollars of the second publicly traded company by total employee hours of the second publicly traded company in a quarter;
comparing the benchmark of the first publicly traded company to the benchmark of the second publicly traded company to determine performance between the first publicly traded company and the second publicly traded company;
calculating with the computer an ROI (return on investment) percentage in cash profits of the first publicly traded company by dividing the Oibit Dollars by a denominator, the denominator being all outstanding shares in the first publicly traded company multiplied by value of the first equity, divided by four; and
calculating with the computer an ROI (return on investment) percentage in cash profits of the second publicly traded company by dividing the Oibit Dollars by a denominator, the denominator being all outstanding shares in the second publicly traded company multiplied by daily trading value of the second equity, divided by four;
determining a change in performance of the first and the second publicly traded company based on the calculated Oibit quarterly dollar benchmark of each publicly traded company;
determining a change in performance of the first and the second publicly traded company based on the calculated ROI of each publicly traded company;
displaying the benchmarks and the ROIs; and
acquiring or divesting additional stock of the first company or the second publicly traded company depending upon which of the Oibit quarterly dollar benchmarks of the first publicly traded company or the second publicly traded company has changed.

2. The method of claim 1, further comprising the steps off displaying the numerical benchmarks and the ROIs on a website.

3. A method for calculating performance of publicly traded stock equity investments with a computer, comprising the steps of:

calculating an individual ROI (return on investments) percentage for each operating facility of a first publicly traded stock investment of a first public company, by a computer by: determining total employee hours of all employees of the first public company in a most recent quarter and determining total employees in each operating facility of the first public company that produce paid hours in each operating facility of the first public company;

a) calculating, by the computer, Oibit dollars by combining all cash into the first public company with all cash out of the first public company, wherein the Obit dollars includes quarterly earnings per common share dollars applicable to common shares, with quarterly income tax expenses, with quarterly interest expenses and quarterly depreciation and amortization expenses of the first public company;

b) calculating a quarter value of the first public company by multiplying outstanding shares in the first public company by a daily trading value of the first stock investment, divided by 4;

c) calculating the (ROI) in cash profits of the first public company by dividing the OiBit dollars by quarter value of the first public company, by the computer;

d) calculating an individual investor transparency benchmark (Bx) for the first stock investment, by combining dollar values of common shares with income tax expenses with interest expenses with depreciation expenses by the computer;

e) calculating an overall investor transparency value (OIV) of the first stock investment of the first company by combining all the individual return on investments (ROIs) with all the individual benchmarks of each operating facility;

repeating steps a)-e) for a second publicly traded stock investment of a second public company;

comparing the OIV of the first company to the OIV of the second company; and displaying OiBit values and ROIs of each publicly traded equity investment, along with the overall investor transparency value (OIV).

4. The method of claim 3, wherein the first stock equity investment and the second stock equity investment are directly compared with one another includes: public stocks.

5. The method of claim 3, wherein the operating facilities is selected from the group consisting of: factories, sales offices, warehouses, and research centers, segments, divisions, groups, and product lines, branches, departments, retail outlets, cost centers, warehouses, research centers, expense classifications, and payroll classifications.

6. The method of claim 5, further comprising the step of:
displaying the OiBit values and the ROIs of each publicly traded equity investment, along with the overall investor transparency value (OIV) on at least one of a grid and a website.

7. The method of claim 1, further comprising the step of:
displaying the OiBit values and the ROIs of each publicly traded equity investment, along with the overall investor transparency value (OIV) on at least one of a grid and a website.

* * * * *